United States Patent [19]

Sikanai

[11] Patent Number: 4,676,677
[45] Date of Patent: Jun. 30, 1987

[54] DOT PATTERN GENERATING SYSTEM
[75] Inventor: Naoki Sikanai, Owariasahi, Japan
[73] Assignee: Hitachi, Ltd., Tokyo, Japan
[21] Appl. No.: 781,511
[22] Filed: Sep. 30, 1985
[30] Foreign Application Priority Data Sep. 29, 1984 [JP] Japan .................................. 59-205313

[51] Int. Cl.⁴ ................................................ B41J 3/12
[52] U.S. Cl. .................................. 400/121; 101/93.05; 400/124; 400/303
[58] Field of Search ............... 400/121, 124, 303, 306, 400/322; 101/93.04, 93.05

[56] References Cited

U.S. PATENT DOCUMENTS

| | | | |
|---|---|---|---|
| 4,213,714 | 7/1980 | Jones | 400/306 X |
| 4,216,480 | 8/1980 | Buehner | 400/126 X |
| 4,326,813 | 4/1982 | Lomicka | 400/306 X |
| 4,459,431 | 7/1984 | Hiroichi | 400/121 X |
| 4,555,191 | 11/1985 | Gojo | 400/121 |

Primary Examiner—Paul T. Sewell
Attorney, Agent, or Firm—Antonelli, Terry & Wands

[57] ABSTRACT

A dot pattern generating system extracts dots with a predetermined interval with respect to a scanning direction from successive dots of a dot information pattern which is generated from a character generator, and varies a dot interval of the dot pattern information with respect to the scanning direction, so that dot pattern information is obtained after predetermined dots are extracted from the successive dots which is printed or displayed as a scaled down character with an arbitrary dot interval.

7 Claims, 55 Drawing Figures

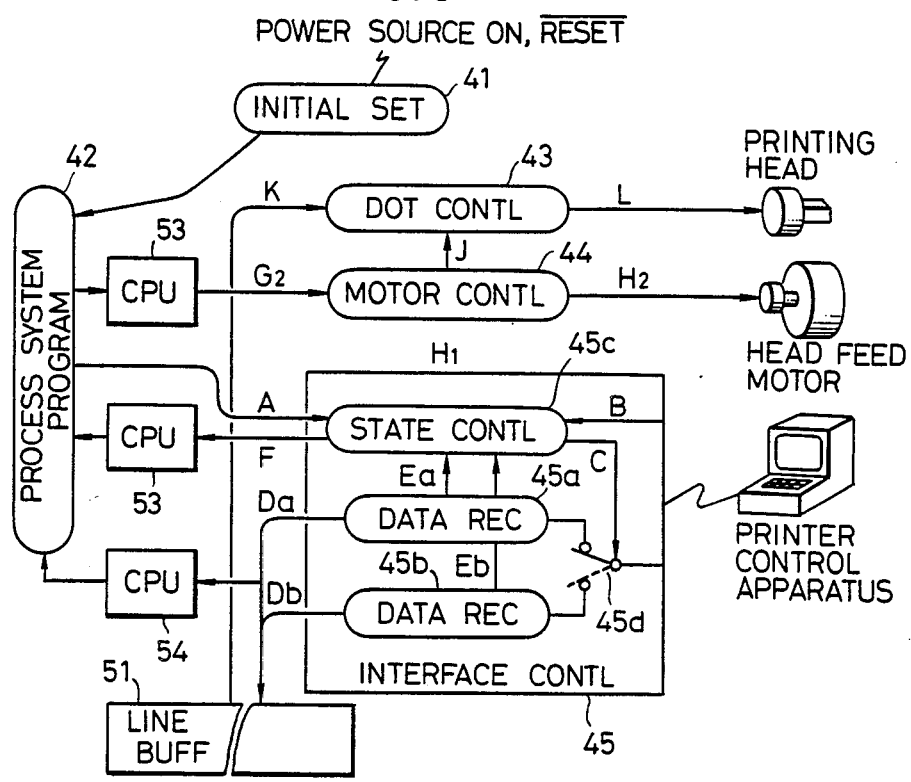
FIG. 3
FIG. 4
FIG. 5

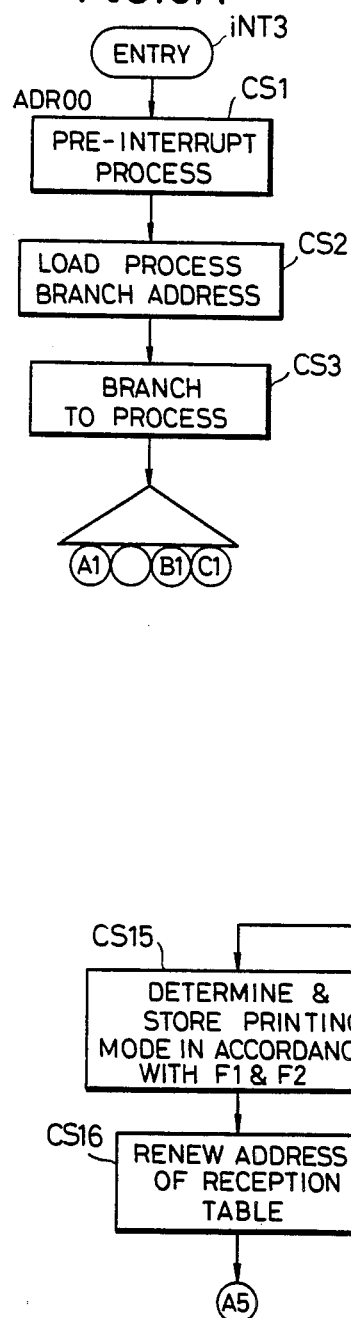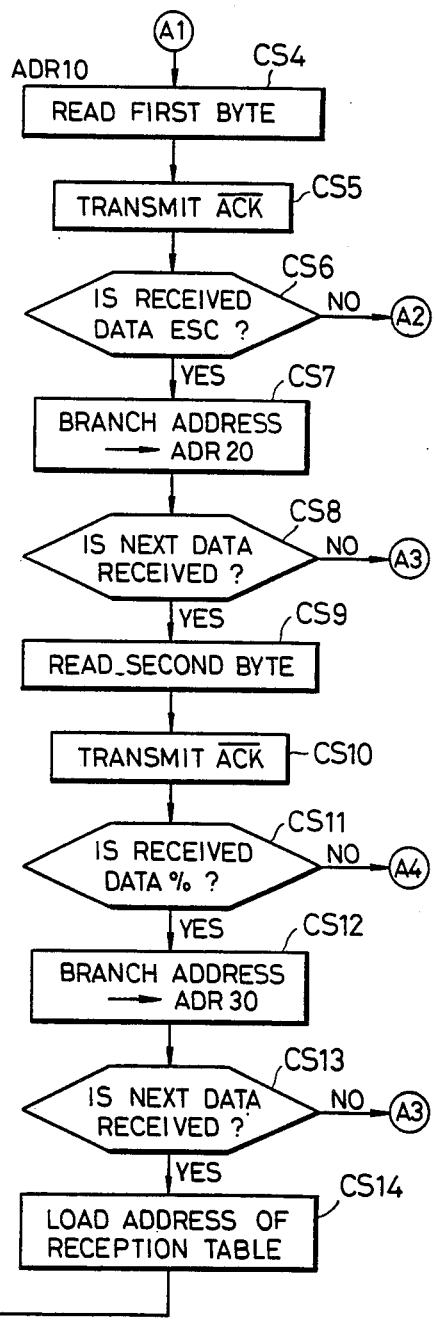

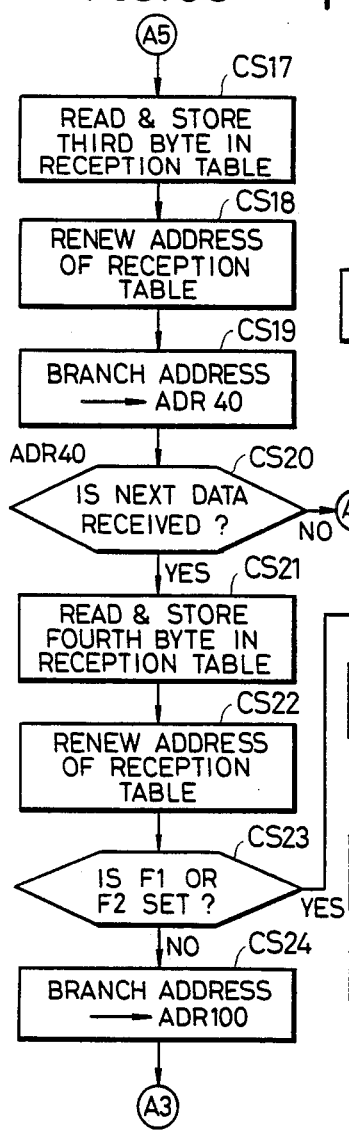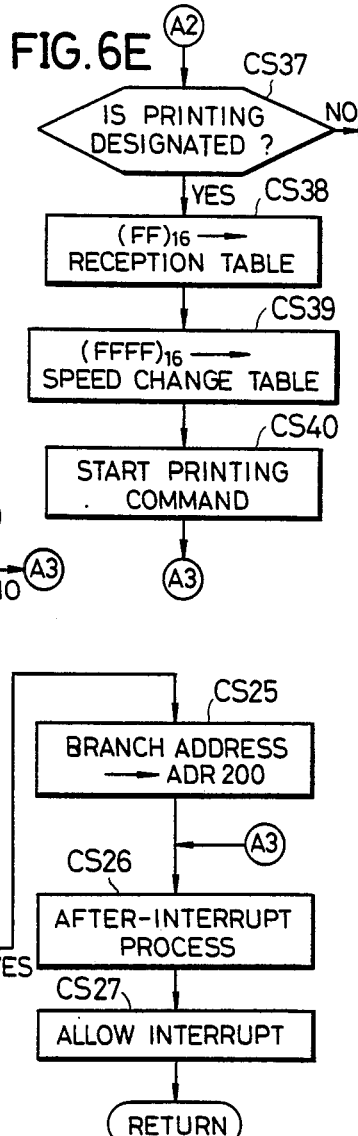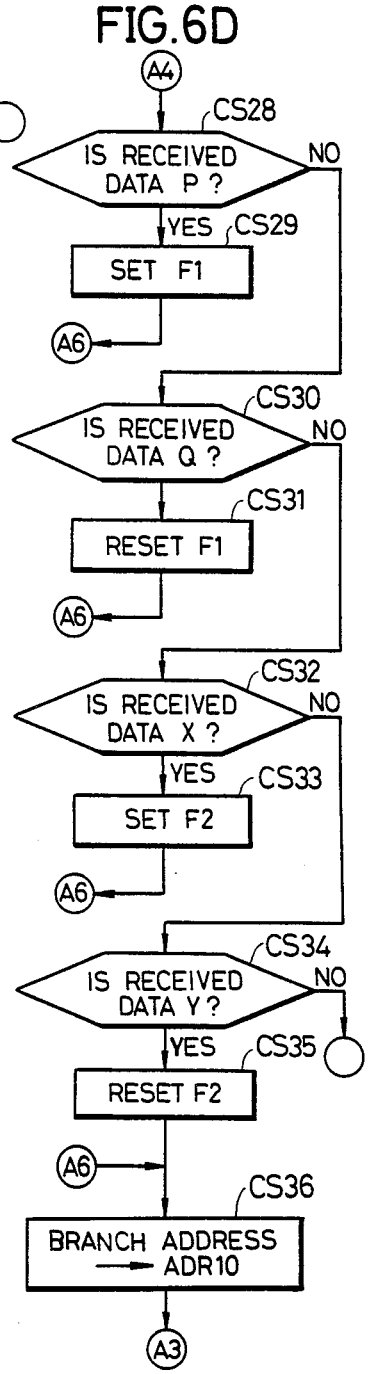

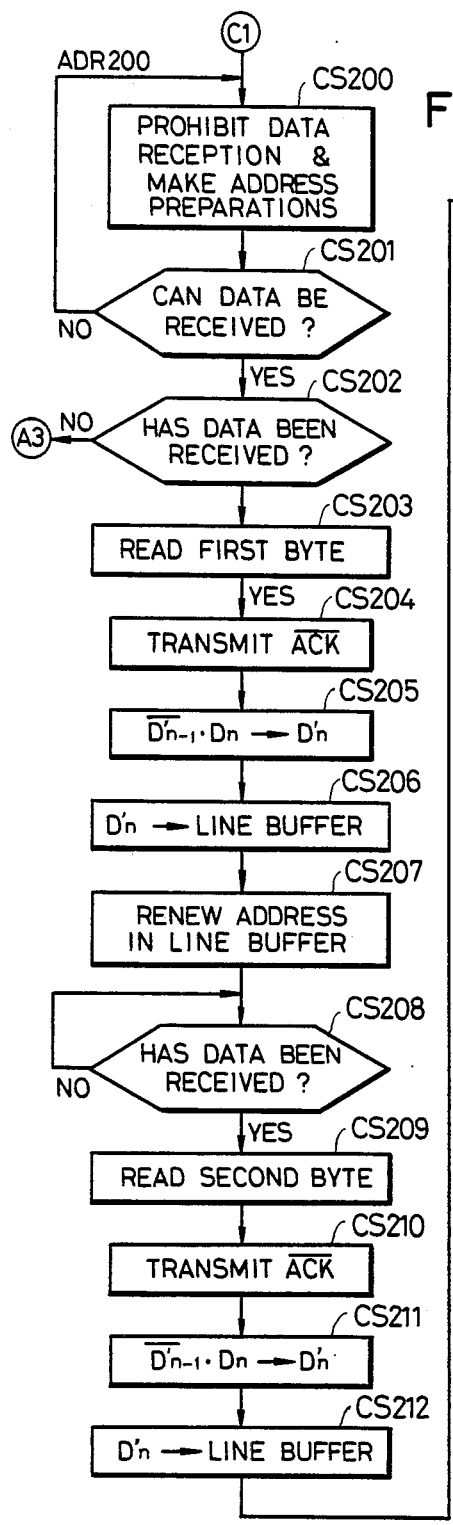
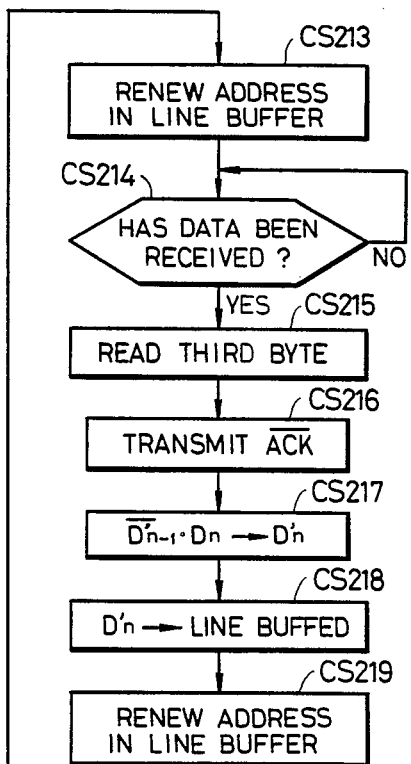
FIG.9A
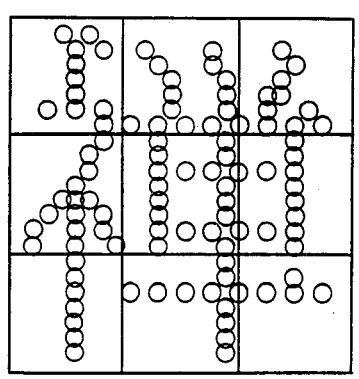
FIG.10

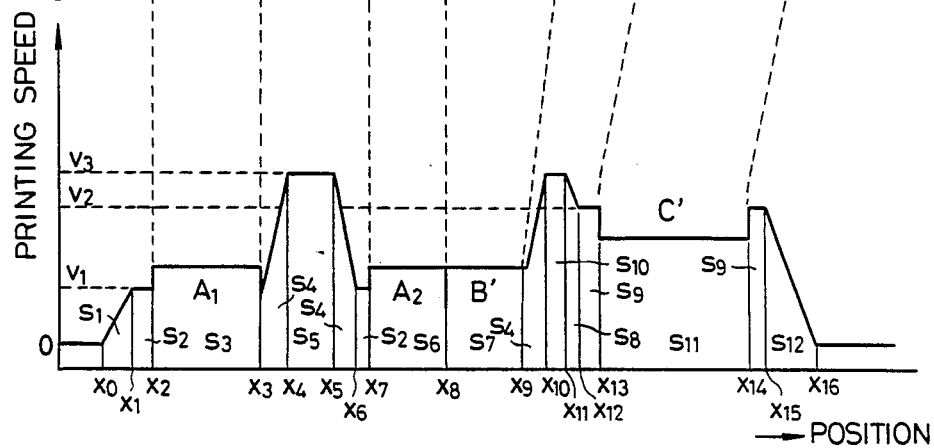

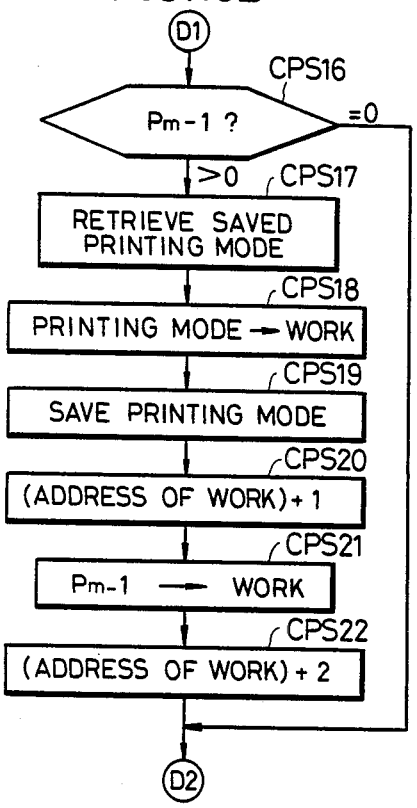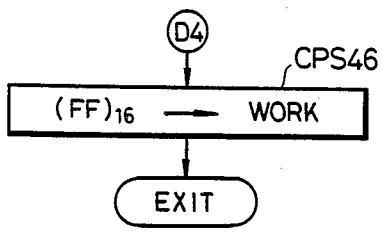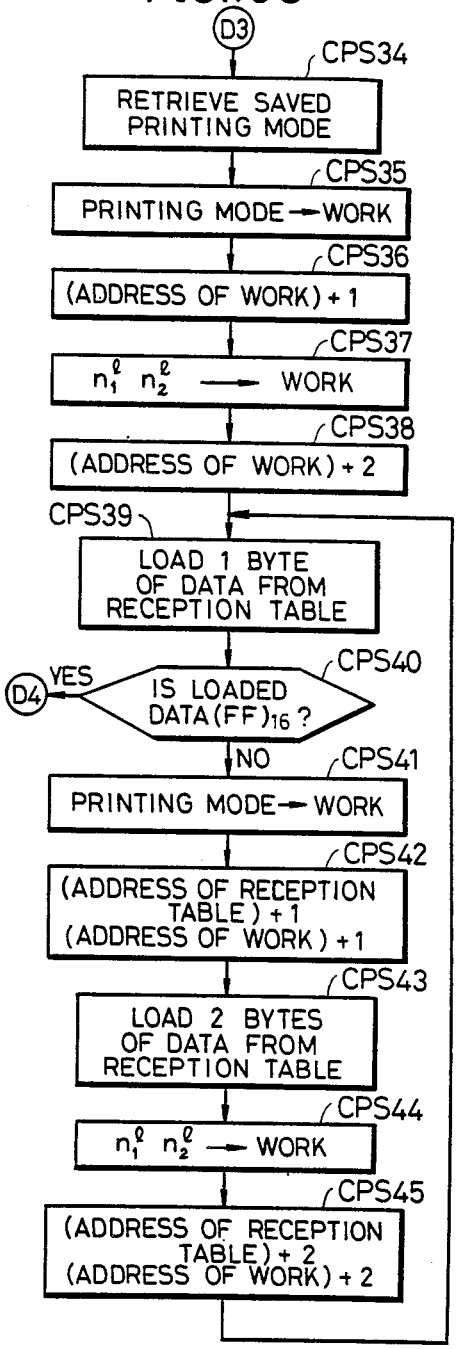

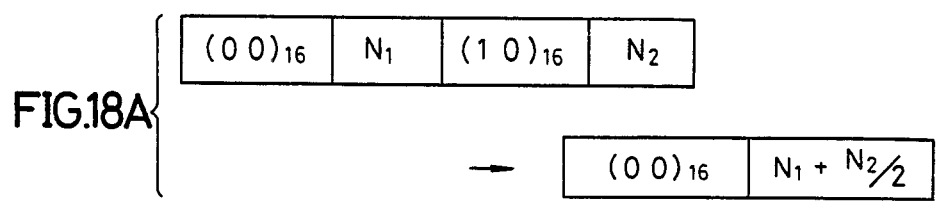
FIG.18A
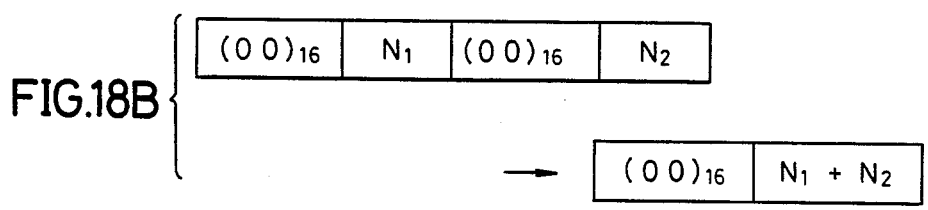
FIG.18B
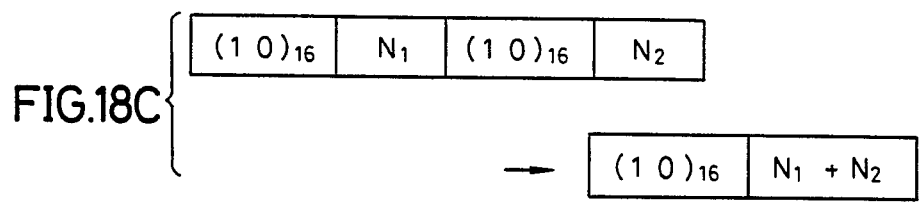
FIG.18C
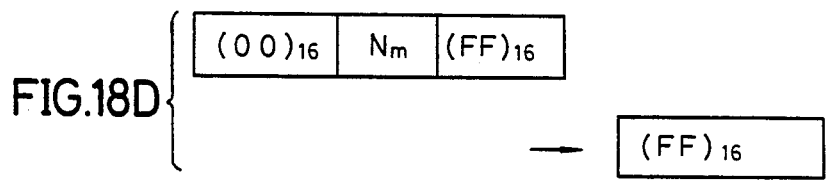
FIG.18D
FIG.19
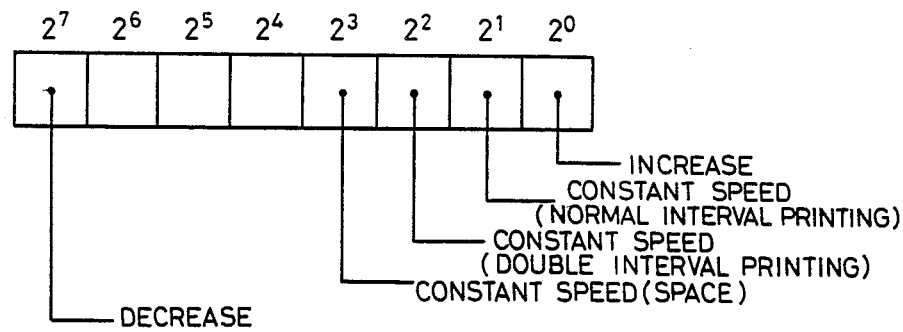
FIG.20
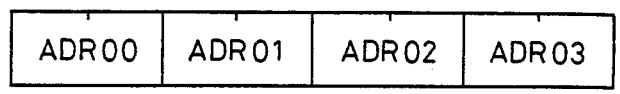

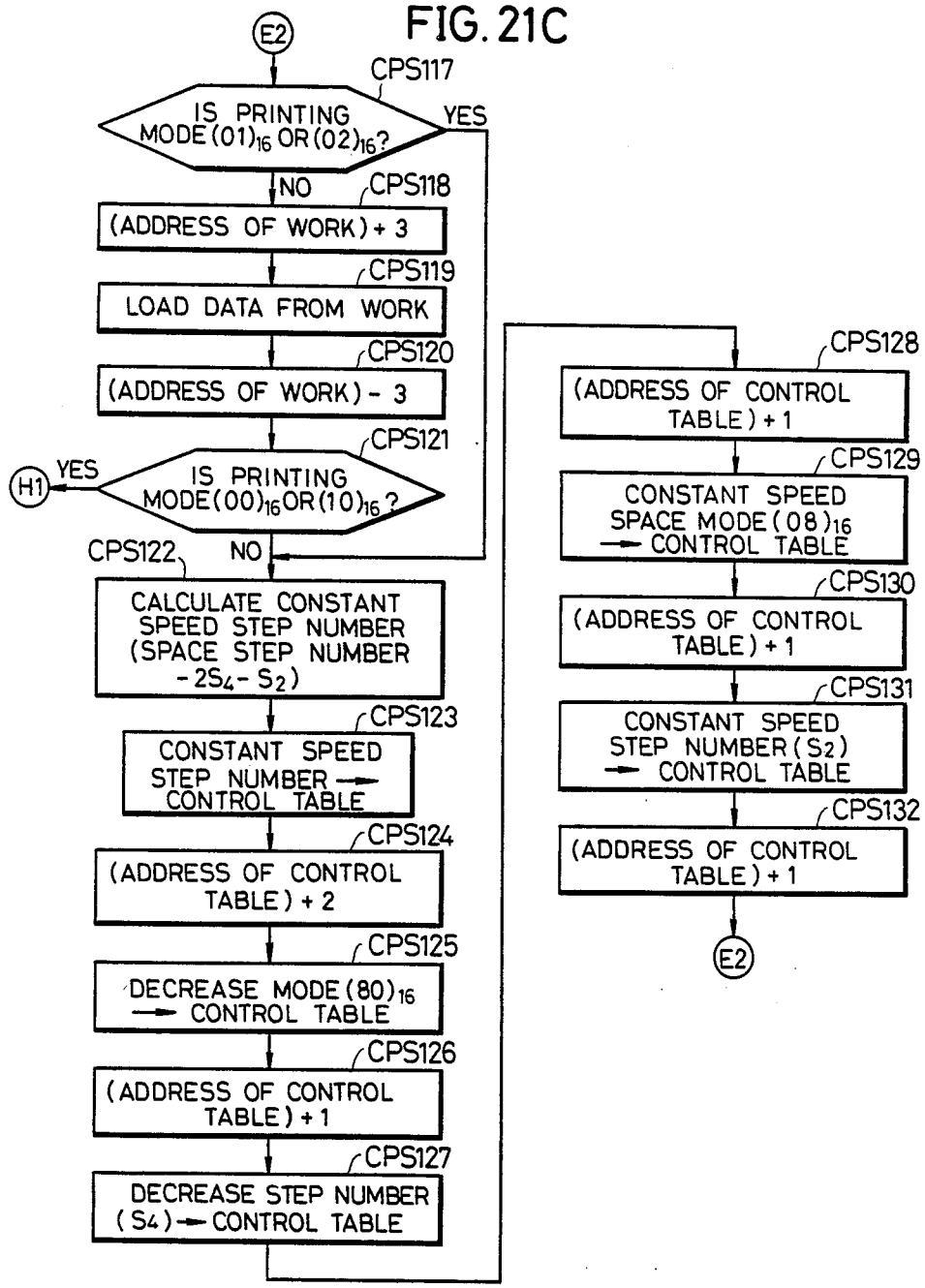

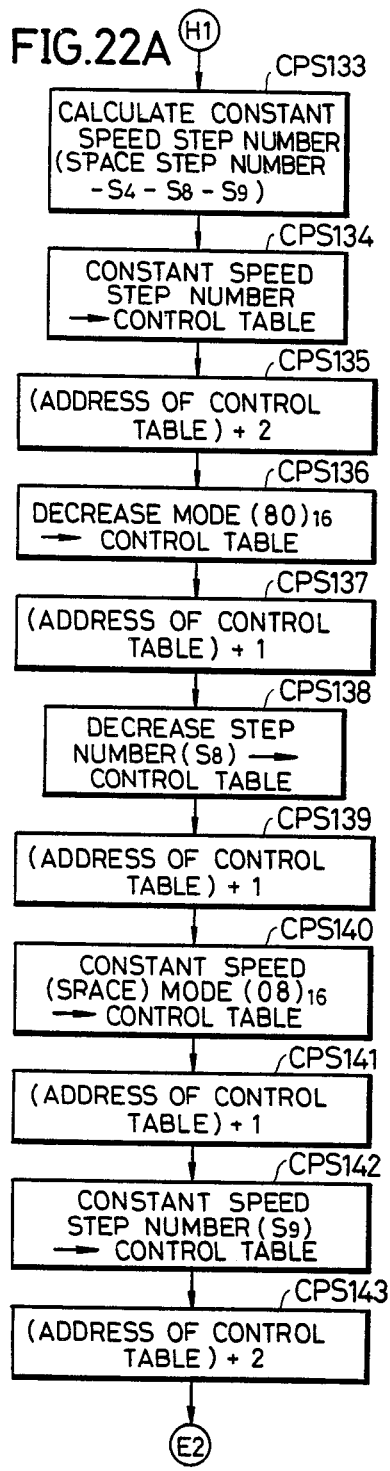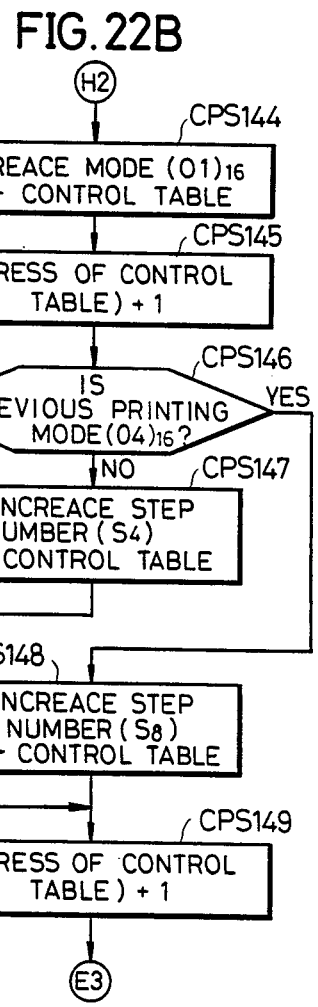

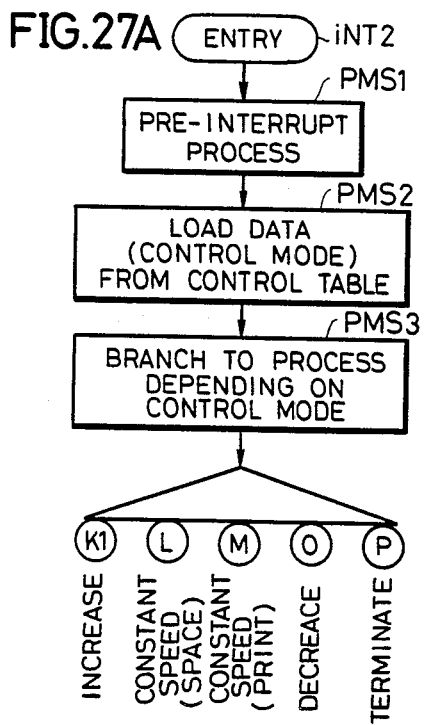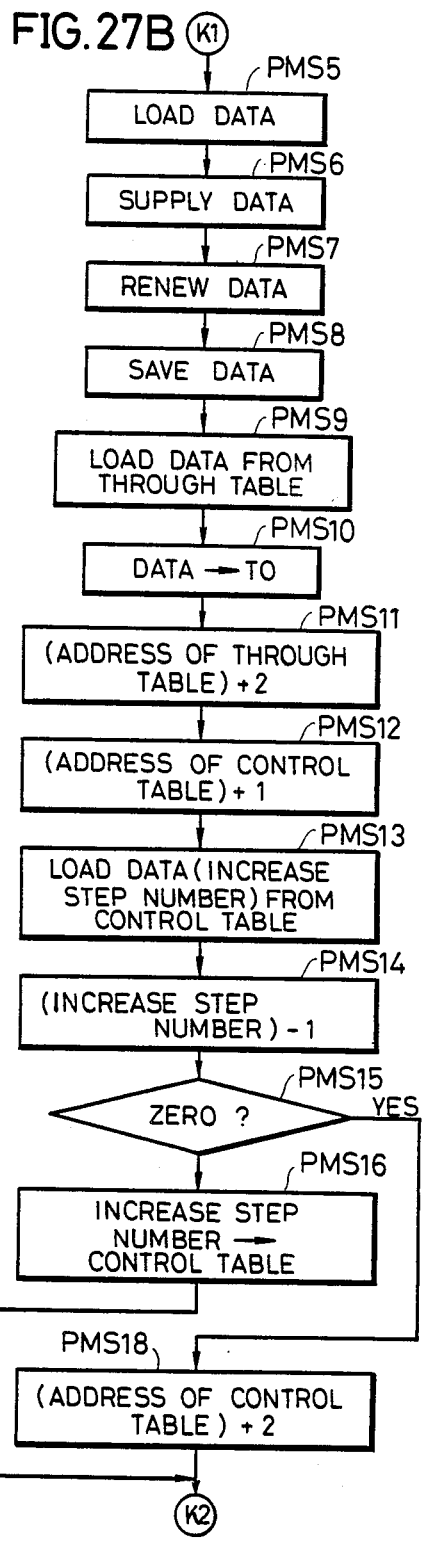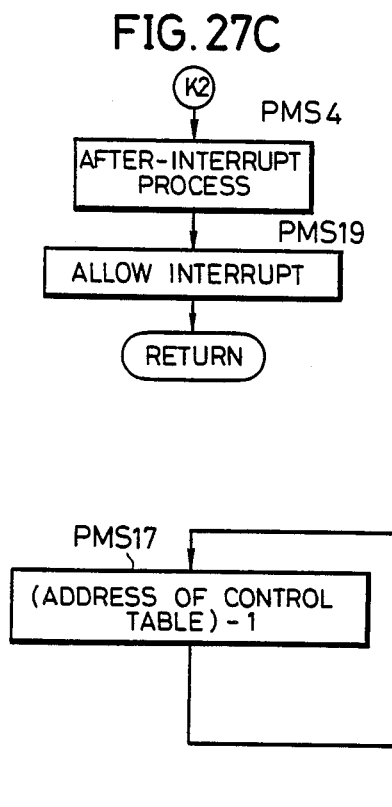

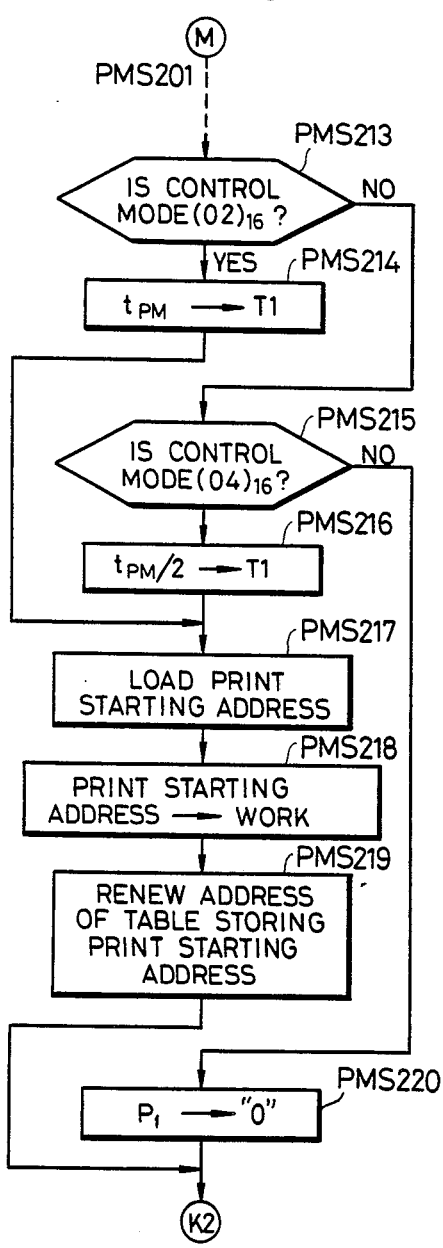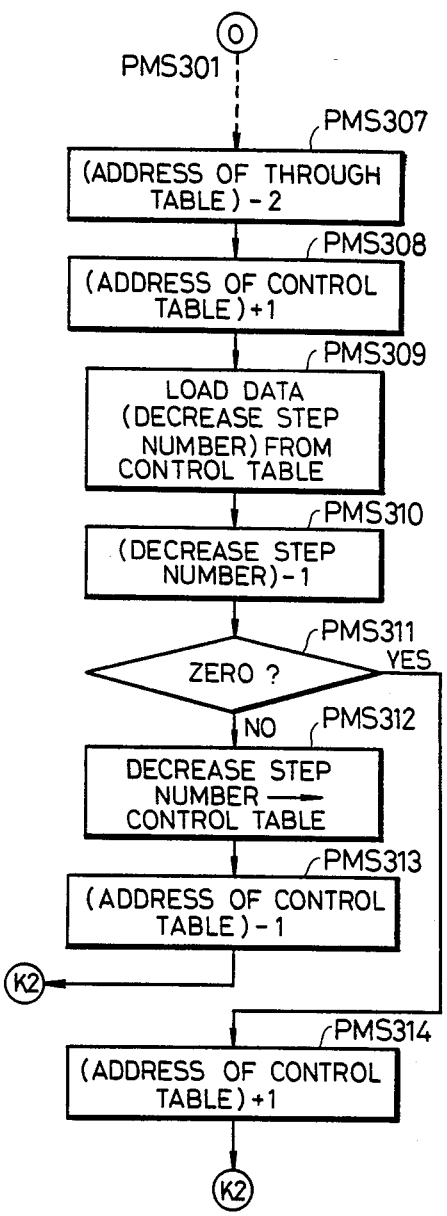

DOT PATTERN GENERATING SYSTEM

BACKGROUND OF THE INVENTION

The present invention generally relates to dot pattern generating systems, and more particularly to a dot pattern generating system which generates scaled down characters with an arbitrary interval to be printed or displayed by use of one kind of a character generator.

In a conventional printing apparatus, there are basically two methods of generating and printing a scaled down character. According to a first method, a character generator exclusively for generating a scaled down character is provided with respect to all of the desired reduction factors of the character. On the other hand, according to a second method, a ratio between a feeding speed of a printing head and a number of times a printing element to be driven is changed for a normal printing and a scaled down printing in a serial printer. In other words, when the ratio for the normal printing is assumed to be 1:1, the ratio is changed to n:m for the scaled down printing, where n is smaller than m, so as to print scaled down characters of various reduction factors by use of a single kind of character generator. For example, the second method of printing is disclosed in a Japanese Laid-Open Patent Application No. 58-127281. However, according to the first method, it is necessary to provide a memory having an extremely large memory capacity in order to print the characters with the desired reduction factor, and this method is undesirable from the economical point of view. On the other hand, according to the second method, the dot density becomes too dense and the discrimination of the character becomes difficult when printing a character such as a chinese character having a dense dot density because the dot pattern is compressed and printed within a small area when printing the scaled down character. Further, according to the second method, the feeding speed of the printing head for the scaled down printing must be reduced to n/m the feeding speed for the normal printing, and the processing capability becomes poor. Moreover, according to the second method, the printing noise increases considerably in the case of an impact type printer.

SUMMARY OF THE INVENTION

Accordingly, it is a general object of the present invention to provide a novel and useful dot pattern generating system in which the disadvantages of the conventional system described heretofore are eliminated.

Another and more specific object of the present invention is to provide a dot pattern generating system which comprises means for extracting dots with a predetermined interval with respect to a scanning direction from successive dots of a dot information pattern which is obtained from a character generator and means for varying a dot interval of the dot pattern information with respect to the scanning direction, wherein a dot pattern information obtained after predetermined dots are extracted from the successive dots is printed or displayed as a scaled down character with an arbitrary dot interval. According to the dot pattern generating system of the present invention, the scaled down character can be printed or displayed with the arbitrary dot interval without adding a character generator exclusively for the printing of the scaled down character, and the system is suited for use in a word processing system which creates documents. In the case where the dot pattern generating system of the present invention is applied to an impact type printer, the scaled down character can be printed without increasing the printing noise.

Other objects and further features of the present invention will be apparent from the following detailed description when read in conjunction with the accompanying drawings.

BRIEF DESCRIPTION OF THE DRAWINGS

FIG. 3 shows the structure of a program stored in a ROM in FIG. 1;

FIG. 4 shows the format of data transmitted from a printer control apparatus;

FIG. 5 is a diagram for explaining the printing designation;

FIGS 6A through 6E and 7A and 7B are flow charts respectively showing a state control routine and a data receiving routine in FIG. 3;

FIGS. 9A and 9B are flow charts showing a data receiving routine in FIG. 3;

FIG. 10 shows a dot matrix of a character printed according to the present invention;

FIGS. 12, 13, and 14 show results obtained when the routines shown in FIGS. 6, 7, and 9 are performed, respectively;

FIG. 15 shows printing operations in correspondence with dot data stored in a line buffer shown in FIG. 14;

FIGS. 16A through 16D are flow charts showing a printing command I in a processing system program;

FIG. 17 shows a printing operation information made from the command shown in FIG. 16;

FIGS. 18A through 18C show processes executed when the space occurs successively;

FIG. 18D shows a process executed when the space occurs before a terminal mark $(FF)_{16}$;

FIG. 19 is a diagram for explaining each mode;

FIG. 20 shows a table which stores each print starting address;

FIGS. 21A through 25 are flow charts respectively showing a printing command II in the processing system program;

FIGS. 27A through 31 are flow charts respectively showing a motor control routine;

DESCRIPTION OF THE PREFERRED EMBODIMENTS

Figure 1:
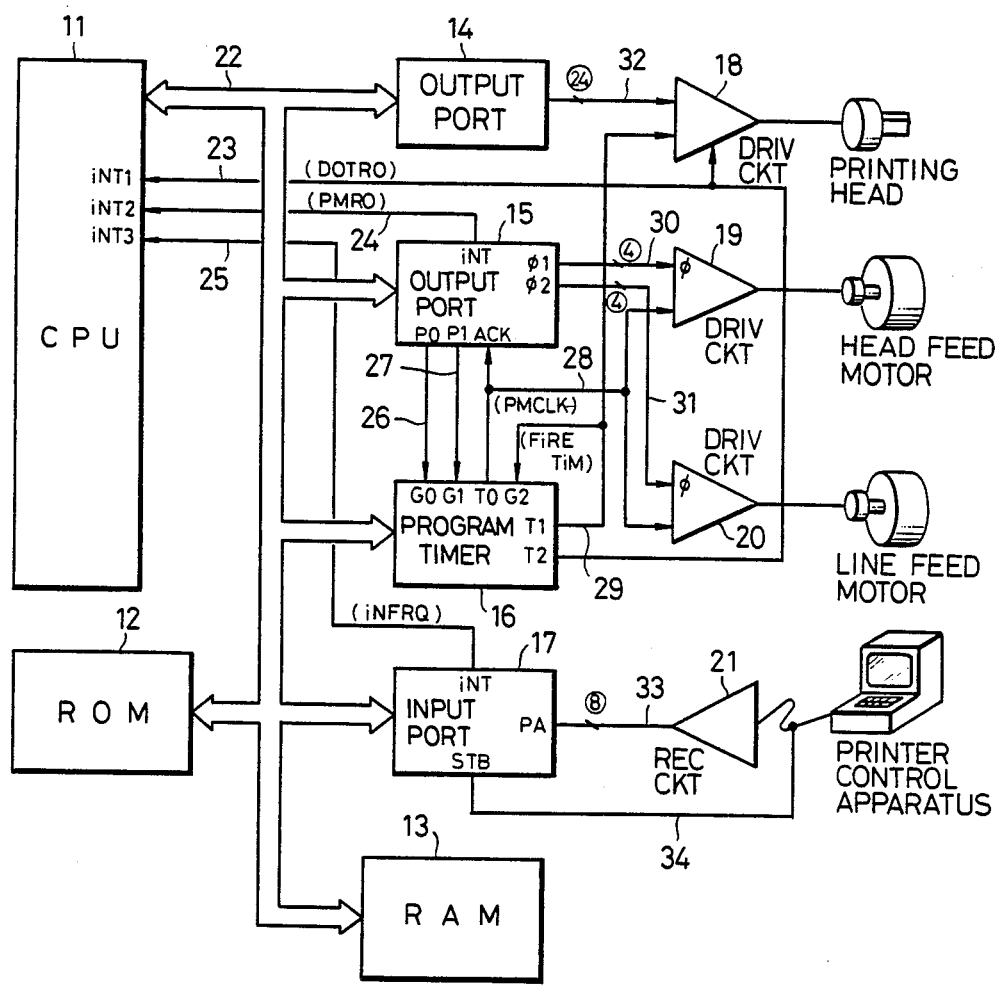
FIG. 1 shows the construction of a control part of a dot matrix type serial printer in an embodiment of the present invention.

FIG. 1 shows the construction of a control part of a dot matrix type serial printer. An output port 14 for supplying dot data (constituted by three bytes or twenty-four bits) 32 for driving each printing element of a printing head to a driving circuit 18, an output port 15 for supplying mutual excitation data (constituted by four bits) 30 to a driving circuit 19 which drives a head feed motor (for example, a stepping motor) for feeding the printing head and for supplying mutual excitation data (constituted by four bits) 31 to a driving circuit 20 which drives a line feed motor (for example, a stepping motor), and a programmable timer 16 for generating timings essential for controlling the printing head and each motor, are respectively coupled to a central processing unit (hereinafter simply referred to as a CPU) 11. An 8-bit control code and dot pattern information (image data) related to chinese characters or the like are transmitted to the serial printer from a printer control apparatus which is provided independently so as to control the serial printer according to the present invention, and are received by a receiving circuit 21. An output of the receiving circuit 21 is transmitted to an input port 17 through an output line 33. The input port 17 latches the control code and the dot pattern information by a strobe pulse signal 34 from the printer control apparatus, and an output of the input port 17 is transmitted to the CPU 11 through a data bus 22. The CPU 11 discriminates the data transmitted thereto and stores the data in the case where the data is the image data, and thus, the data is passed through the data bus 22 and is transmitted to a random access memory (RAM) 13 which is used as a line buffer or an operation register. A program for processing the program execution of the CPU 11 is stored in a read only memory (ROM) 12.

Figure 2:
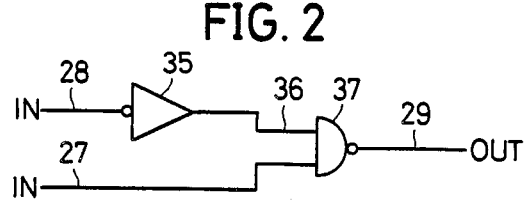
FIG. 2 is a logic circuit diagram showing a conventional circuit for generating an excitation timing pulse signal.

A timing pulse signal 28 which determines the timing with which the mutual excitation data of each motor is renewed, is obtained from a terminal (timer part) T0 of the programmable timer 16 and is supplied to the driving circuits 19 and 20 and a terminal ACK of the output port 15. A signal line 26 from an output terminal P0 of the output port 15 is connected to an input terminal G0 of the programmable timer 16, and the timing pulse signal 28 is generated only when the signal transmitted through the signal line 26 has a logic level "1". When the generation of the timing pulse signal 28 is detected at the terminal ACK of the output port 15, a mutual excitation data request signal 24 from a terminal iNT of the output port 15 is supplied to a terminal iNT2 of the CPU 11. The request signal 24 is reset with a timing with which the CPU 11 sets the mutual excitation data in the output port 15. An excitation timing pulse signal 29 for the printing elements of the printing head is obtained from a terminal (timer part) T1 of the programmable timer 16 and is supplied to the driving circuit 18. At the same time, when the generation of the timing pulse signal 29 is detected at a terminal G2 of the programmable timer 16, a signal 23 from a terminal T2 of the programmable timer 16 also becomes an excitation signal for each of the printing elements. A signal line 27 from an output terminal P1 of the output port 15 is connected to an input terminal G1 of the programmable timer 16, and the timing pulse signal 29 is generated only when the signal transmitted through the signal line 27 has a logic level "1". When the data and a strobe pulse signal 34 is received from the printer control apparatus, a data reception request signal 25 is supplied to a terminal iNT3 of the CPU 11 from a terminal iNT of the input port 17. The reception request signal 25 is reset with a timing with which the CPU 11 reads the received data. In the control part having the construction shown in FIG. 1, the point which differs from that of the conventional control part is that two kinds of timers are provided in FIG. 1, that is, one timer for generating the timing pulse signal 28 which provides the timing which determines the feeding speed of the printing head and one timer for generating the timing pulse signal 29 which provides the timing which determines the number of times each printing element of the printing head is driven per unit time. The timings of the two timers can be set arbitrarily and independently according to the constant of the program. Conventionally, the timing pulse signal 29 is obtained by a circuit shown in FIG. 2. In FIG. 2, the timing pulse signal 28 is passed through an inverter 35 so as to apply a high pulse signal 36 to one input terminal of a 2-input NAND gate 37 which has the signal line 27 connected to the other input terminal thereof, and the timing pulse signal 29 is obtained from the NAND gate 37.

Next, description will be given with respect to the structure of the program stored in the ROM 12 shown in FIG. 1, by referring to FIG. 3. The program is started only when the power source is turned ON or a signal $\overline{\text{RESET}}$ is received from the printer control apparatus. The program comprises an initial setting routine 41 for setting each unit shown in FIG. 1 into an initial state, a processing system program 42, a dot control routine 43 which is an iNT1 interrupt routine, a motor control routine 44 which is an iNT2 interrupt routine, and an interface control 45 which is an iNT3 interrupt routine. The interface control 45 comprises a state control routine 45c for discriminating the control code received from the printer control apparatus and for causing a processing in correspondence with the control code, a data receiving routine 45a for receiving and storing the image data in a line buffer, and a data receiving routine 45b. A line buffer 51 and CPUs 52, 53, and 54 are also shown in FIG. 3.

The format of the data transmitted from the printer control apparatus is shown in FIG. 4. In FIG. 4, the first two bytes ESC and % designate image printing, third and fourth bytes n₁ and n₂ designate the data length (number of dot rows), and the fifth and following bytes correspond to the image data. In addition, as shown in FIG. 5, the designation of the ½-width scaled down character printing is determined by ESC and P, the cancellation of the ½-width scaled down character printing is determined by ESC and Q, the designation of the high-speed character printing (hereinafter simply referred to as a high-speed printing) is determined by ESC and X, and the cancellation of the high-speed printing is determined by ESC and Y. The switching program 45d shown in FIG. 3 is controlled by the state control routine 45c so that the data receiving routine 45b is selected after ESC and P or ESC and X are received and the data receiving routine 45a is selected before ESC and P or ESC and X are received or when the designation is cancelled by ESC and Q or ESC and Y. In the present specification, a ½-width scaled down character printing (hereinafter simply referred to as a ½-width printing) refers to a printing in which the height of the character which is printed is the same as that of the character which is printed during a normal character printing (normal printing) but the width of the character which is printed is ½ that of the character printed during the normal printing.

FIGS. 6A through 6E are flow charts showing the state control routine 45c. This process is started by the iNT3 interrupt routine, and a step CS1 shown in FIG. 6A performs a pre-interrupt processing including the saving of the necessary information in a register. Next, a step CS2 loads process branch addresses to which the process is to branch, and a step CS3 branches to each process in accordance with the process branch address. The initial value of the process branch address is ADR10, for example, and the process branches to a step CS4 shown in FIG. 6B. A step CS4 reads the first byte of the received data, and a step CS5 transmits a response pulse (data request signal) $\overline{ACK}$ to the printer control apparatus. A step CS6 discriminates whether or not the received data is ESC, and a step CS7 is executed when the discrimination result in the step CS6 is YES and a step CS37 shown in FIG. 6E is executed when the discrimination result is NO. The step CS7 changes the process branch address to ADR20 and the process branches to a step CS8. The step CS8 discriminates whether or not the next data has been received by reading a flag bit in the input port 17, and a step CS9 is executed when the discrimination result in the step CS8 is YES. On the other hand, a step CS26 shown in FIG. 6C is executed when the discrimination result in the step CS8 is NO.

The step CS9 reads the second byte of the received data, and a step CS10 transmits the data request signal $\overline{ACK}$. A step CS11 discriminates whether or not the received data is %, and a step CS12 is executed when the discrimination result in the step CS12 is YES and a step CS28 shown in FIG. 6D is executed when the discrimination result is NO. The step CS12 changes the process branch address to ADR30 and the process branches to a step CS13. The step CS13 similarly discriminates whether or not the next data has been received, and a step CS14 is executed when the discrimination result in the step CS13 is YES and the step CS26 is executed when the discrimination result is NO. The step CS14 loads a starting address from a reception table which stores the printing mode and the number of dot rows based on the received data. A step CS15 determines and stores the printing mode in the reception table in accordance with a flag F1 which designates the ½-width printing and a flag F2 which designates the high-speed printing. A next step CS16 renews (increments by one) the address of the reception table. A step CS7 reads and stores the third byte of the received data ($n_1$) in the reception table, and a step CS18 renews the address of the reception table. A step CS19 changes the process branch address to ADR40 and the process branches to a step CS20. The step CS20 discriminates whether or not the next data has been received, and a step CS21 is executed when the discrimination result in the step CS20 is YES and the step CS26 is executed when the discrimination result is NO. A step CS21 reads and stores the fourth byte of the received data ($n_2$) in the reception table. A step CS22 renews the address of the reception table, and a step CS23 discriminates whether or not the flat F1 or F2 is set. When the flag F1 or F2 is set and the discrimination result in the step CS23 is YES, a step CS25 changes the process branch address to ADR200 which is the starting address of the data receiving routine 45b. On the other hand, when both the flags F1 and F2 are reset and the discrimination result in the step CS23 is NO, a step CS24 changes the process branch address to ADR100 which is the starting address of the data receiving routine 45a and the process jumps to the step CS26. The step CS26 performs an after-interrupt processing including retrieval of the necessary information saved in the register, and a step CS27 allows the iNT3 interrupt routine and the process is thereafter returned.

A step CS28 discriminates whether or not the received data is P, and when the received data is P and the discrimination result in the step CS28 is YES, a step CS29 sets the flag F1 and the process jumps to a step CS36. On the other hand, when the discrimination result in the step CS28 is NO, a step CS30 is executed. The step CS30 discriminates whether or not the received data is $\underline{Q}$, and when the received data is Q and the discrimination result in the step CS30 is YES, a step CS31 resets the flag F1 and the process jumps to the step CS36. On the other hand, when the discrimination result in the step CS30 is NO, a step CS32 discriminates whether or not the received data is $\underline{X}$. When the received data is X and the discrimination result in the step CS32 is YES, a step CS33 sets the flag F2 and the process jumps to the step CS36. A step CS34 discriminates whether or not the received data is $\underline{Y}$ when the discrimination result in the step CS32 is NO. When the received data is Y and the discrimination result in the step CS34 is YES, a step CS35 resets the flag F2. The process jumps to other steps when the discrimination result in the step CS34 is NO. The step CS36 changes the process branch address to ADR10 and the process jumps to the step CS26. The step CS37 discriminates whether or not the received data designates printing. When the received data does not designate printing and the discrimination result in the step CS37 is NO, the process jumps to other steps. But when the discrimination result in the step CS37 is YES, a step CS38 sets a termination mark represented by $(FF)_{16}$ in the reception table. In the present specification, a code in brackets with a subscript "16" represents a hexadecimal code. A step CS39 sets a termination mark represented by $(FFFF)_{16}$ in a speed change table which stores information related to the starting position of the space dot and the space size, when the space data within the printing data continues for over a predetermined quantity. A step CS40 starts a printing command within the processing system program and the process jumps to the step CS26.

Figure 7A:
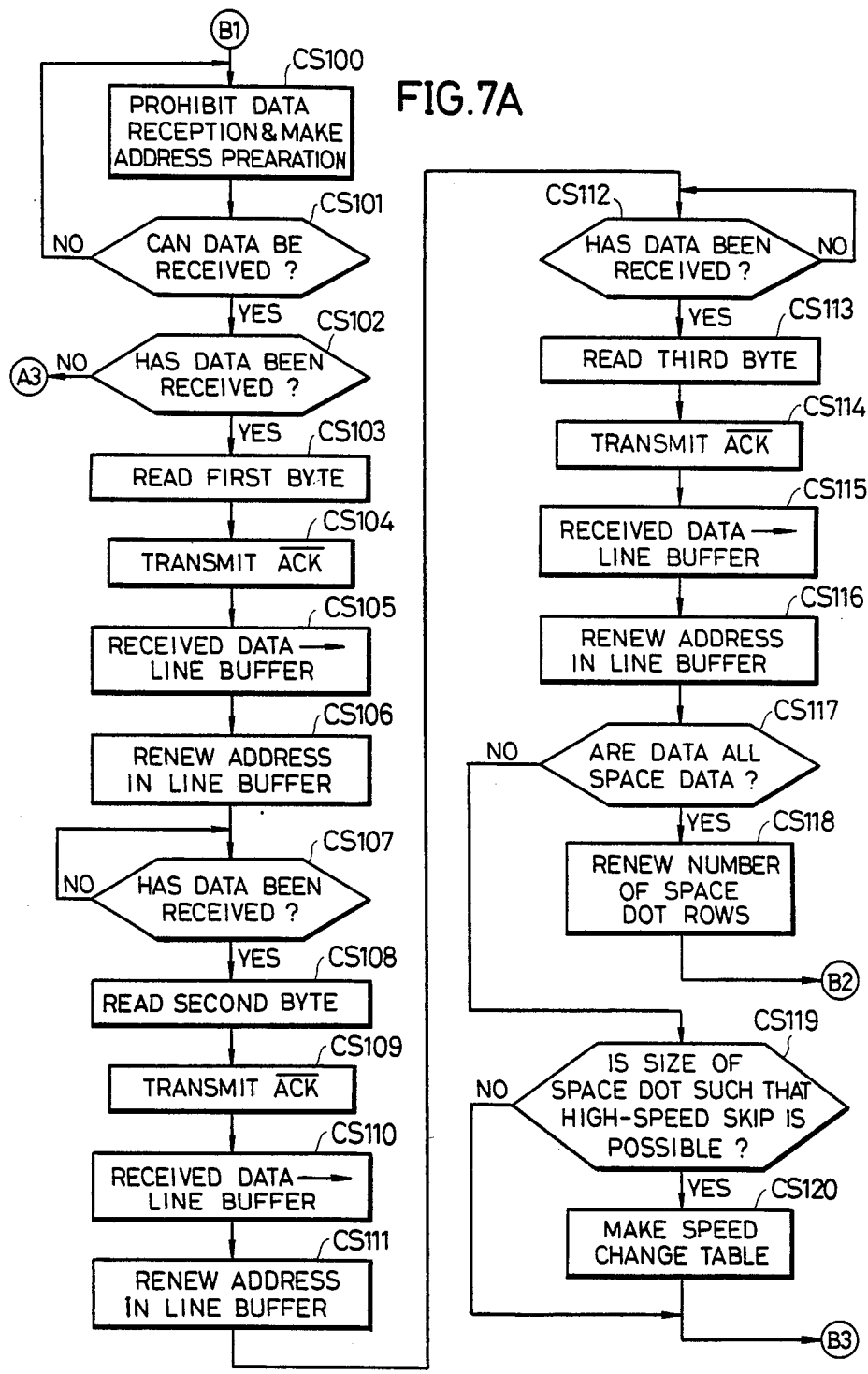
Figure 7B:
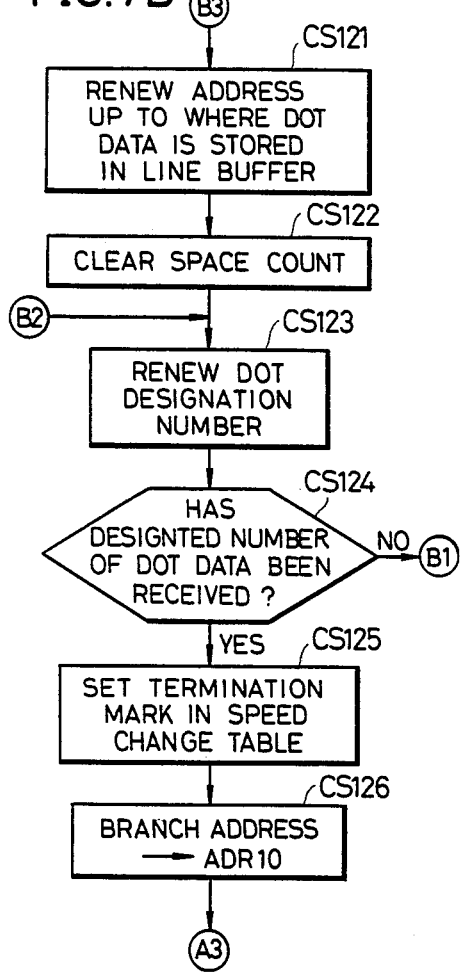

FIGS. 7A and 7B are flow charts showing the data receiving routine 45a. In the present embodiment, the line buffer 51 shown in FIG. 3 is commonly used as an output buffer for supplying the dot data to the printing head and an input buffer for storing the dot data received from the printer control apparatus, so as to reduce the memory capacity of the RAM. In this case, while the printing is carried out, that is, while the dot data of the line which is being printed is obtained, the dot data of the next line is stored. Hence, it is necessary to enter the dot data of the next line while observing the empty state of the line buffer 51. In FIG. 7A, a step CS100 prohibits reception of the data and makes address preparations, and a step CS101 discriminates whether or not there is sufficient space in the line buffer 51 to receive and enter the data. A step CS102 discriminates whether or not the data has been received, and the process jumps to the step CS26 shown in FIG. 6C when the discrimination result in the step CS102 is NO. On the other hand, when the discrimination result in the step CS102 is YES, a step CS103 reads the first byte of data related to one dot row. A step CS104 transmits the data request signal $\overline{ACK}$, a step CS105 stores the received data in the line buffer, and a step CS106 renews the address in the line buffer. A step CS107 discriminates whether or not the second byte of the data has been received, and the step CS107 is repeated until the discrimination result becomes YES. When the discrimination result in the step CS107 becomes YES, processes similar to the processes performed in the steps CS103 through CS106 are performed in steps CS108 through CS111 with respect to the second byte of the data. Steps CS112 through CS116 perform processes similar to the processes performed in the steps CS107 through CS111, with respect to the third byte of the data. A step CS117 discriminates whether or not the three bytes of data are all space data. When the three bytes of data are all space data and the discrimination result in the step CS117 is YES, a step CS118 increases the number of space dot rows by one and the process jumps to a step CS123 shown in FIG. 7B. On the other hand, when the discrimination result in the step CS117 is NO, a step CS119 discriminates the size of the space dot by discriminating how much space data has been received. In the case where the size of the space dot is sufficiently large such that a high-speed skip operation can be performed, a step CS120 makes the speed change table by storing the information related to the starting position of the space dot and the space size in the speed change table. The information related to the starting position of the space dot does not indicate the position from the start of the line, but indicates the position in terms of the number of dot rows within each image data designated by $n_1$ and $n_2$.

Figure 8:
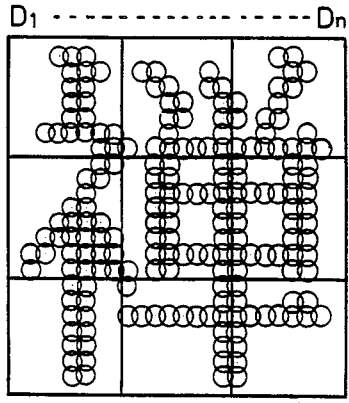
FIG. 8 shows a dot matrix of a character printed according to the present invention.

When the discrimination result in the step CS119 is NO, the process jumps to a step CS121. The step CS121 renews the address up to where the dot data is stored in the line buffer, and a step CS122 clears the space count. A step CS123 renews the dot designation number (corresponding to $n_1$ and $n_2$ in FIG. 4) by decrementing the dot designation number by one. A step CS124 discriminates whether or not the designated number of dot data has been received. When the designated number of dot data has been received and the discrimination result in the step CS124 is YES, a step CS125 sets a termination mark represented by $(FF00)_{16}$ in the speed change table, and a step CS126 changes the process branch address to ADR10, that is, the process jumps to the step CS26 shown in FIG. 6C. When the discrimination result in the step CS124 is NO, the process jumps to the step CS100. In the data receiving routine 45a, when the dot pattern information of a chinese character such as that shown in FIG. 8 is transmitted from the printer control apparatus, the dot pattern information is stored in the line buffer as it is with the transmitted sequence.

Figure 9B:
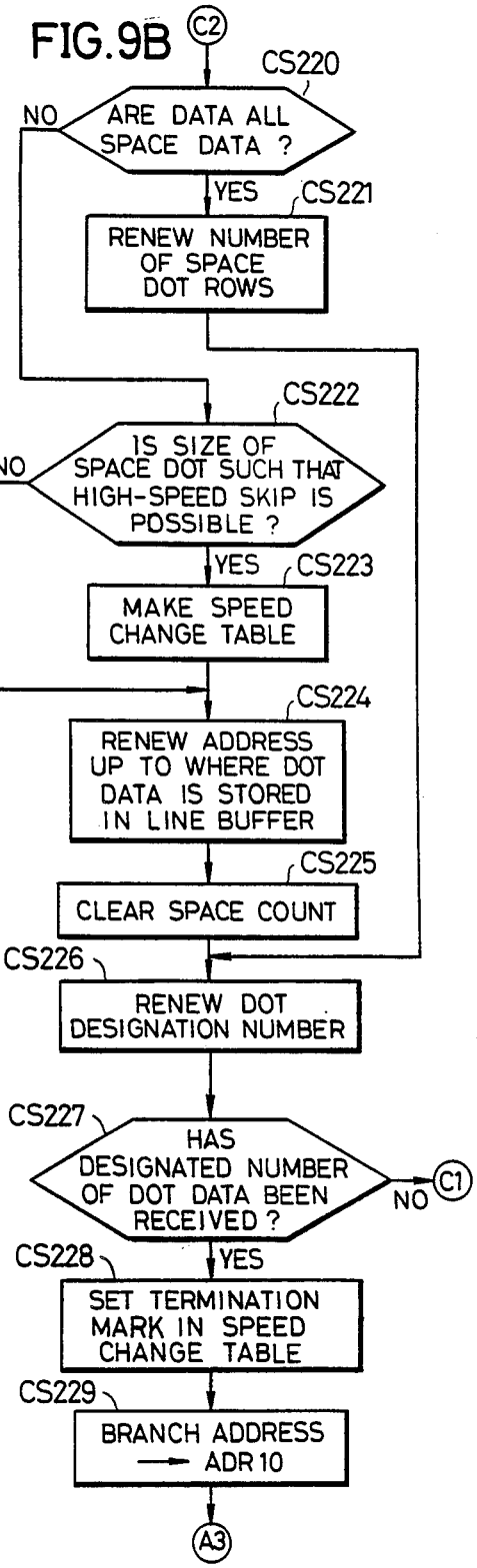

FIGS. 9A and 9B are flow charts showing the data receiving routine 45b. The data receiving routine 45b differs from the data receiving routine 45a shown in FIGS. 7A and 7B in that the data receiving routine 45b extracts dots with a predetermined interval from the successive dots of the received data before storage into the line buffer by performing a logic operation $\overline{D'_{n-1}} \cdot D_n$. $D'_{n-1}$ represents data obtained by the extraction of predetermined dots from the successive dots with respect to the data received one dot before, $\overline{D'_{n-1}}$ represents an inverted data of $D'_{n-1}$ $D_n$ represents the received data, and $\overline{D'_{n-1}} \cdot D_n$ is the data obtained by performing an AND operation between the data $\overline{D'_{n-1}}$ and $D_n$.

The flow charts shown in FIGS. 9A and 9B are identical to those shown in FIGS. 7A and 7B except for steps CS205, CS211, and CS217 which are added to extract dots with a predetermined interval from the successive dots before storage into the line buffer so as to obtain data $D'_n$ by performing the logic operation $\overline{D'_{n-1}} \cdot D_n$.

The data entered in this manner is stored in the line buffer as if the dot pattern information shown in FIG. 10 were transmitted from the printer control apparatus.

Figure 11:
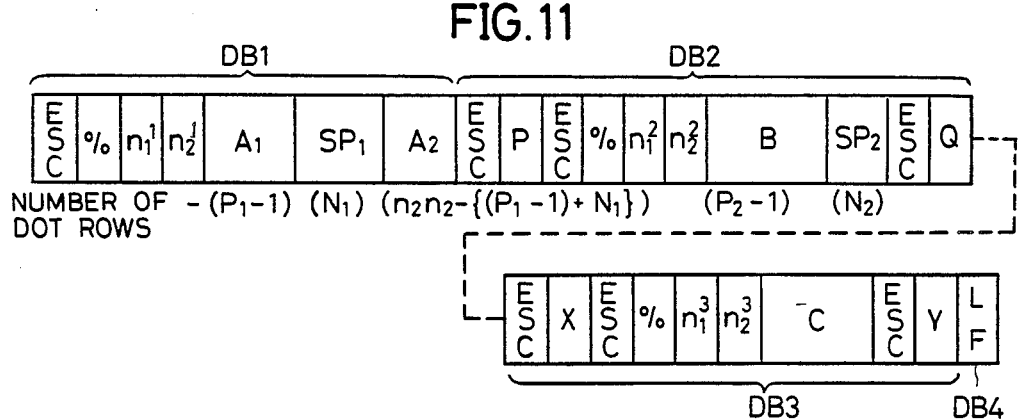
FIG. 11 shows an example of received data from the printer control apparatus.

FIG. 11 shows an example of the data received from the printer control apparatus, and the received data is constituted by data blocks DB1 through DB4. The data block DB1 comprises ESC and % which designate the image printing, $n_1^1$ and $n_2^1$ which indicate the data length, and the dot data. The dot data of the data block DB1 comprises dot data $A_1$ corresponding to $P_1-1$ dots, space dot data $SP_1$ corresponding to $N_1$ dots, and dot data $A_2$ corresponding to $n_1^1 \cdot n_2^1 - [(P_1-1)+N_1]$ dots. The data block DB2 comprises the first ESC and P which designate the ½-width printing, the second ESC and % which designate the image printing, $n_1^2$ and $n_2^2$ which indicate the data length, the dot data, and the third ESC and Q cancel the ½-width printing. The dot data of the data block DB2 comprises dot data B corresponding to $P_2-1$ dots, and space dot data $SP_2$ corresponding the $N_2$ dots. The data block DB3 comprises the first ESC and X which designate the high-speed printing, the second ESC and % which designate the image printing, $n_1^3$ and $n_2^3$ which indicate the data length, dot data C corresponding to $n_1^3 \cdot n_2^3$ dots, and the third ESC and Y which cancel the high-speed printing. The data block DB4 comprises a code LF which is a printing line feed command.

Figure 12:
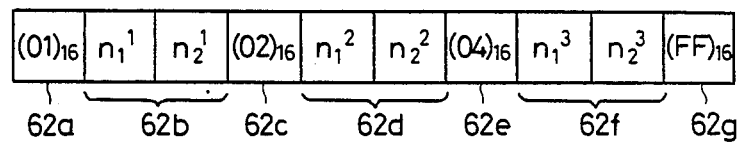
Figure 13:
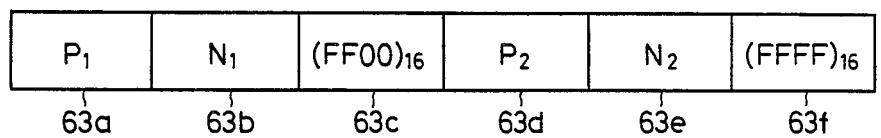

The results obtained when the state control routine 45c shown in FIGS. 6A through 6E, the data receiving routine 45a shown in FIGS. 7A and 7B, and the data receiving routine 45b shown in FIGS. 9A and 9B are respectively performed with respect to the data shown in FIG. 11, are shown in FIGS. 12 through 14. FIG. 12 shows a reception table 62 comprising in the following sequence a normal printing mode 62a represented by $(01)_{16}$, a number 62b of dot rows (data length) represented by $n_1^1$ and $n_2^1$, a ½-width printing mode 62c represented by $(02)_{16}$, a number 62d of dot rows (data length) represented by $n_1^2$ and $N_2^2$, a high-speed printing mode 62e represented by $(04)_{16}$, a number 62f of dot rows (data length) represented by $n_1^3$ and $n_2^3$, and a termination mark 62g represented by $(FF)_{16}$. FIG. 13 shows a speed change table 63 comprising in the following sequence information 63a, 63b, 63c, 63d, 63e, and 63f represented by $P_1$, $N_1$, $(FF00)_{16}$, $P_2$, $N_2$, and $(FFFF)_{16}$, respectively. FIG. 14 shows a line buffer 61 storing therein in the following sequence dot data 61a represented by $A_1$, space dot data 61b represented by $SP_1$, dot data 61c represented by $A_1$, dot data 61d represented by B', space dot data 61e represented by $SP_2$, and dot data 61f represented by C', where B' and C' indicate dot data respectively obtained by extracting dots with a predetermined interval from successive dots with respect to the dot data B and C.

FIG. 15 shows the printing operations in correspondence with the dot data stored in the line buffer 51 shown in FIG. 14. In FIG. 15, $x_0$ indicates a stopping position of the printing head. From the position $x_0$ to a position $x_1$ of the printing head, the printing speed is increased up to a normal printing speed $v_1$ in $s_1$ steps. From the position $x_1$ to a position $x_2$, the printing head is moved with a constant speed for $s_2$ steps (space). The printing head is moved with a constant speed for $s_3$ steps from the position $x_2$ to a position $x_3$ so as to print the dot data $A_1$ (normal printing). From the position $x_3$ to a position $x_4$, the printing speed is increased up to a speed $v_3$ of the high-speed skipping in $s_4$ steps, and the printing head is moved with a constant speed for $s_5$ steps from the position $x_4$ to a position $x_5$ (space). The printing speed is decreased down to the normal printing speed $v_1$ in $s_4$ steps from the position $x_5$ to a position $x_6$, and the printing head is moved with a constant speed for $s_6$ steps from the position $x_6$ to a position $x_7$ (space). From the position $x_7$ to a position $x_8$, the printing head prints the dot data $A_2$ in $s_6$ steps with a constant speed (normal interval printing), and the dot data $B'$ is printed in $s_7$ steps from the position $x_8$ to a position $x_9$ with a constant speed (double interval printing). The printing speed is increased up to the speed $v_3$ of the high-speed skipping in $s_4$ steps from the position $x_9$ to a position $x_{10}$, and the printing head is moved with a constant speed for $s_{10}$ steps from the position $x_{10}$ to a position $x_{11}$ (space). From the position $x_{11}$ to a position $x_{12}$, the printing speed is decreased down to a speed $v_2(=2v_1)$ of the high-speed printing for $s_8$ steps, and the printing head is moved with a constant speed for $s_{11}$ steps from the position $x_{12}$ to a position $x_{13}$ (space). The printing head is moved with a constant speed in $s_{11}$ steps from the position $x_{13}$ to a position $x_{14}$ and prints the dot data C (normal interval printing). From the position $x_{14}$ to a position $x_{15}$, the head is moved with a constant speed for $s_9$ steps (space), and the printing speed is decreased down to zero in $s_{12}$ steps from the position $x_{15}$ to a position $x_{16}$ so as to stop the printing operation.

The control information required to perform the printing operation shown in FIG. 15 is obtained from the reception table 62 shown in FIG. 12 and the speed change table 63 shown in FIG. 13. As a first stage, printing operation information shown in FIG. 17 is formed from the reception table 62 and the speed change table 63 based on the printing command I within the processing system program shown in FIGS. 16A through 16D. A first step CPS1 in FIG. 16A loads one byte of data (printing mode) from the reception table, and a step CPS2 discriminates whether or not the loaded data from the reception table is $(FF)_{16}$. When the loaded data from the reception table is not $(FF)_{16}$ and the discrimination result in the step CPS1 is NO, a step CPS3 increments the address of the reception table by one, and a step CPS4 saves the printing mode in a predetermined RAM. A step CPS5 loads two bytes of data (number of dot rows) from the reception table, and a step CPS6 increases the address of the reception table by two. A step CPS7 loads two bytes of data (information related to the starting position of the space) from the speed change table, and a step CPS8 increases the address of the speed change table by two. A step CPS9 discriminates whether or not the loaded data from the speed change table is $(FFFF)_{16}$. When the discrimination result in the step CPS9 is NO, a step CPS10 discriminates whether or not the loaded data from the speed change table is $(FF00)_{16}$. The process jumps to a step CPS16 shown in FIG. 16B when the discrimination result in the step CPS10 is NO. In the case where a result $(P_m-1)$ which is obtained by subtracting one from the space starting position is positive, a step CPS17 retrieves the printing mode which is saved in the step CPS4, and a step CPS18 stores the printing mode in a printing information table (hereinafter referred to as a work) which is used to store information related to the printing operation. The step CPS19 again saves the printing mode, and a step CPS20 increments the address of the work by one. A step CPS21 stores in the work the result which is obtained by subtracting one from the above space starting position, and a step CPS22 increases the work address by two.

Figure 16A:
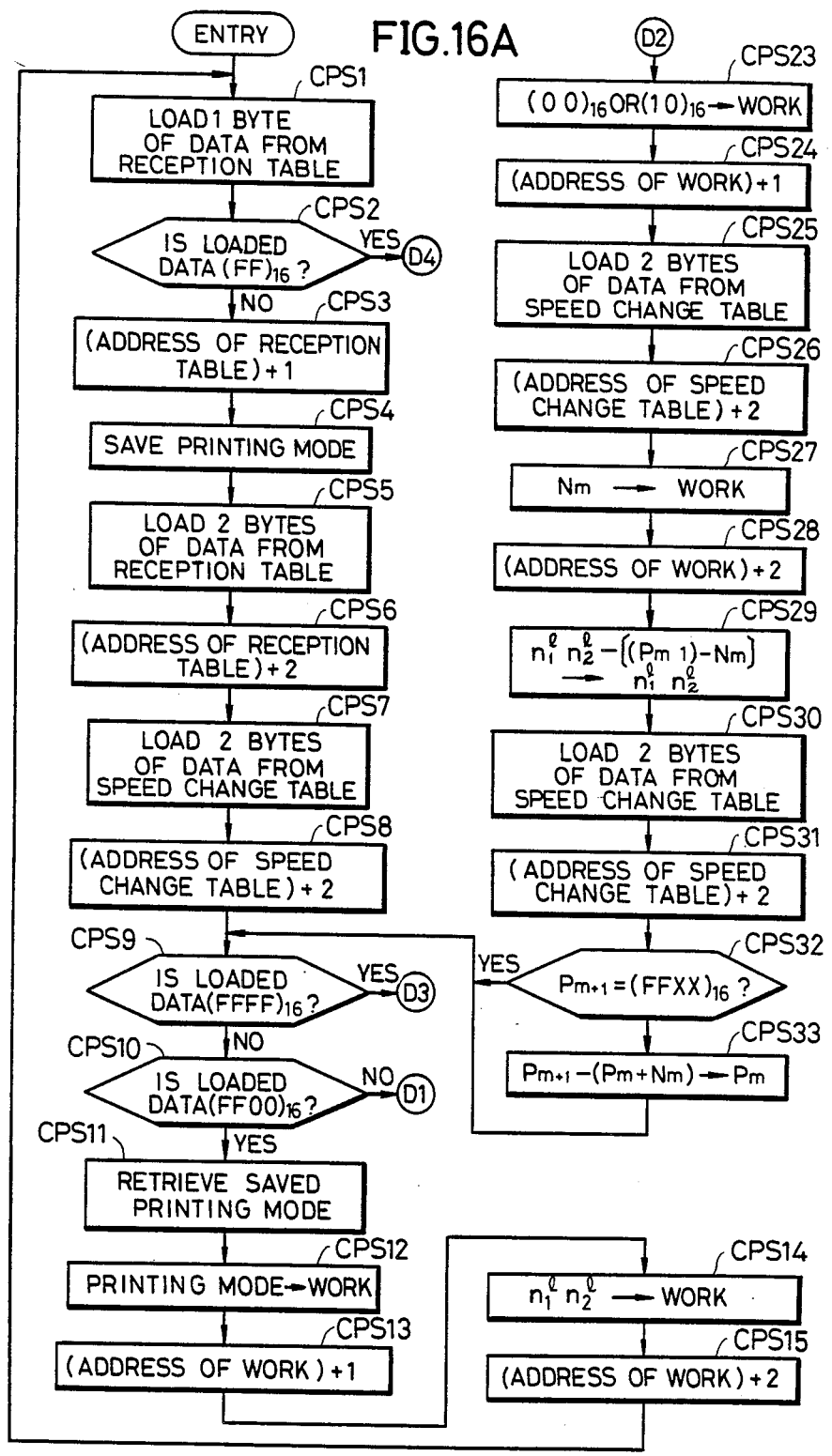

On the other hand, when the result obtained in the step CPS16 is zero, the process jumps to a step CPS23 shown in FIG. 16A. The step CPS23 stores $(00)_{16}$ in the work when the printing mode is $(01)_{16}$ or $(04)_{16}$, and stores $(10)_{16}$ in the work when the printing mode is $(02)_{16}$. A step CPS24 increments the address of the work by one, and a step CPS25 loads two bytes of data (number of space dots=$N_m$) from the speed change table. A step CPS26 increases the address of the speed change table by two, and a step CPS27 stores the number of space dots in the work. A step CPS28 increases the address of the work by two. A step CPS29 sets the result which is obtained by subtracting $P_m-1+N_m$ from the number $n_1{}^l \cdot n_2{}^l$ of printing dot rows to $n_1{}^l \cdot n_2{}^l$. A step CPS30 loads two bytes of data $(P_{m+1})$ from the speed change table, and a step CPS31 increases address of the speed change table by two. A step CPS32 discriminates whether or not $P_{m+1}$ is $(FFXX)_{16}$. When the discrimination result in the step CPS32 is NO, a step CPS33 calculates $P_{m+1}-(P_m+N_m)$ and sets the calculated result to $P_m$, and the process jumps to the step CPS9. On the other hand, when the discrimination result in the step CPS32 is YES, the process jumps to the step CPS9. When $P_m$ is $(FF00)_{16}$ and the discrimination result in the step CPS10 is YES, a step CPS11 retrieves the saved printing mode and a step CPS12 stores the retrieved printing mode in the work. A step CPS13 increments the address of the work by one, and a step CPS14 stores a number $n_1{}^l \cdot n_2{}^l$ of printing dot rows in the work. A step CPS15 increases the address of the word by two, and the process jumps to the step CPS1.

When $P_m$ is $(FFFF)_{16}$ and the discrimination result in the step CPS9 is YES, the process jumps to a step CPS34 shown in FIG. 16C which saves the printing mode. A step CPS35 stores the waved printing mode, and a step CPS36 increments the address of the work by one. A step CPS37 stores a number $n_1{}^l \cdot n_2{}^l$ of printing dot rows in the work, and a step CPS38 increases the address of the work by two. A step CPS39 loads one byte of data (printing mode) from the reception table, and a step CPS40 discriminates whether or not the loaded data is $(FF)_{16}$. When the discrimination result in the step CPS40 is NO, a step CPS41 stores the printing mode in the work, and a step CPS42 increments the address of the work by one. A step CPS43 loads two bytes of data $(n_1{}^l \cdot n_2{}^l)$ from the reception table, and a step CPS44 stores $n_1{}^l \cdot n_2{}^l$ in the work. A step CPS45 increases the address of the reception table by two, and the process jumps to the step CPS39. When the printing mode is $(FF)_{16}$ in the step CPS2 or CPS40, the process jumps to a step CPS46 shown in FIG. 16D. The step CPS46 stores $(FF)_{16}$ in the work and terminates the process.

FIG. 17 shows a work 64 which is obtained as a result of the process shown in FIGS. 16A through 16D. The work 64 comprises in the following sequence a normal printing mode 64a represented by $(01)_{16}$, a number 64b of printing dot rows represented by $P_1-1$, a normal interval space mode 64c represented by $(00)_{16}$, a number 64d of space dot rows represented by $N_1$, a normal printing mode 64e represented by $(01)_{16}$, a number 64f of printing dot rows represented by $n_1^1 \cdot n_2^1 - (P_1-1) - N_1$, a double interval printing mode 64g represented by $(02)_{16}$, a number 64h of printing dot rows represented by $P_2-1$, a double interval space mode 64i represented by $(10)_{16}$, a number 64j of space dot rows represented by $N_2$, a high-speed printing mode 64k represented by $(04)_{16}$, a number 64l of printing dot rows represented by $n_1^3 \cdot n_2^3$, and a termination mark 64m represented by $(FF)_{16}$.

In the case where the space occurs successively with the contents of the work described above, processes shown in FIGS. 18A, 18B, and 18C are performed.

Because the data of the work becomes discontinuous as a result of the processes shown in FIGS. 18A through 18C, the latter data are pushed to the front. In addition, when a space exists before the terminal mark $(FF)_{16}$, this space is deleted, and $(FF)_{16}$ is pushed to the front. In other words, a process shown in FIG. 18D is performed.

Further, in the case where the same printing mode occurs successively, a similar process is performed to push the latter data to the front.

Figure 21A:
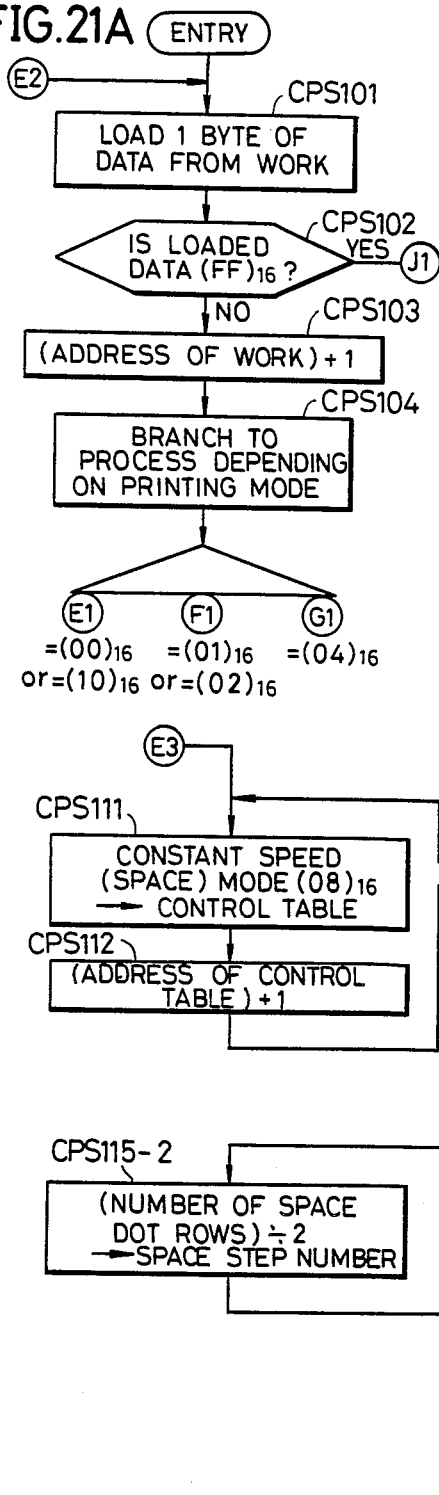
Figure 25:
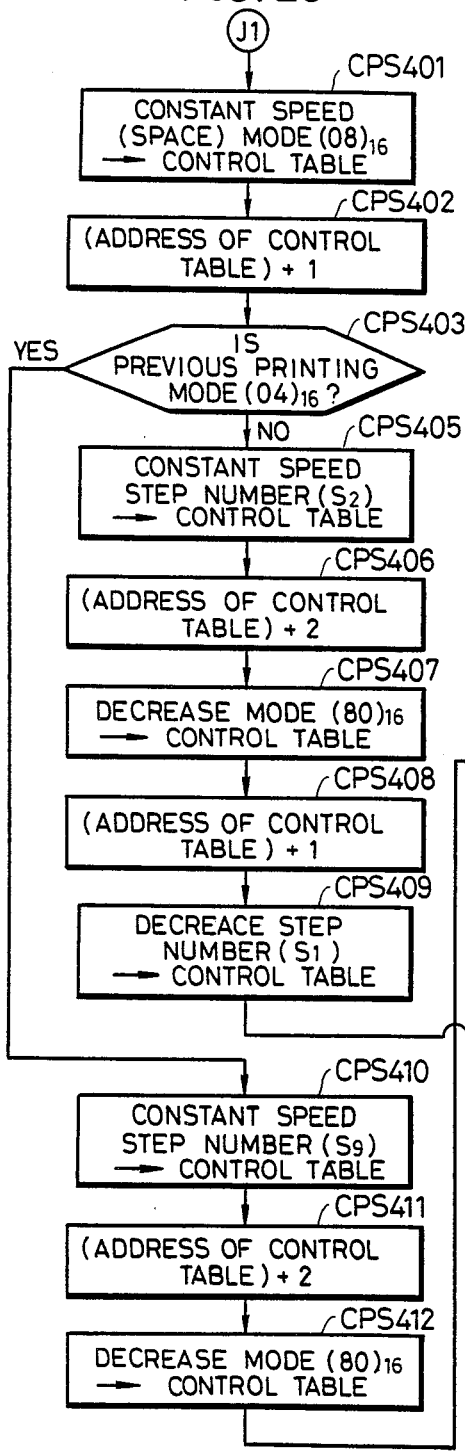
Figure 26:
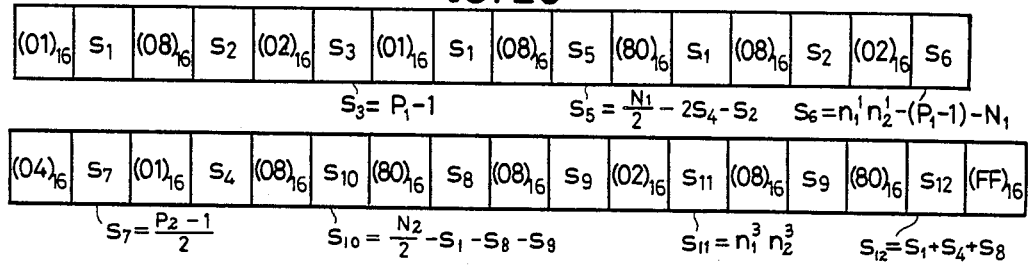
FIG. 26 shows a control table made by the processing shown in FIGS. 21A through 25.
Figure 28:
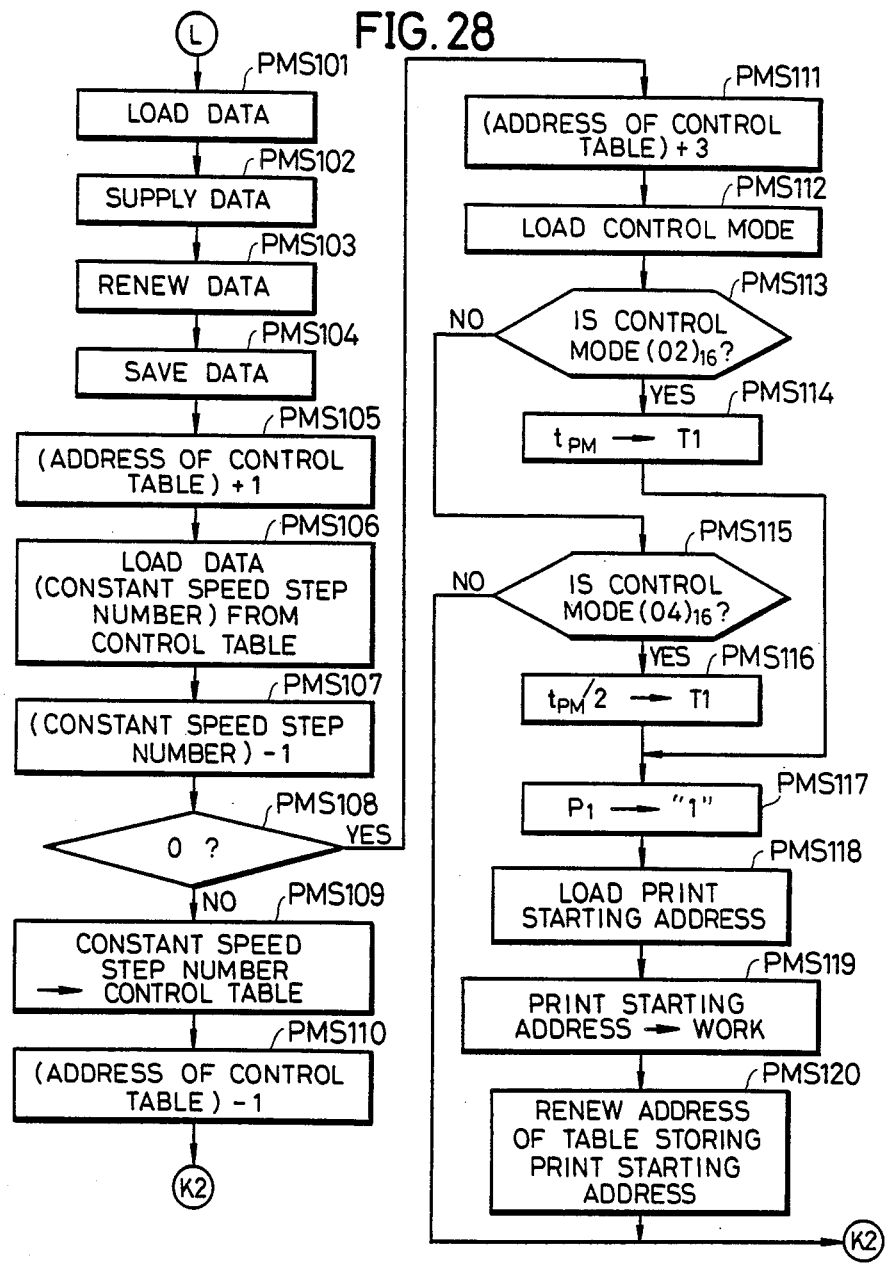

Next, in a second stage, a control table shown in FIG. 26 is obtained by a printing command II shown in FIGS. 21A through 25. In FIG. 21A, a step CPS101 loads one byte of data (printing mode) from the work, and a step CPS102 discriminates whether or not the data is $(FF)_{16}$. A step CPS103 increments the address of the work by one when the discrimination result in the step CPS102 is NO, and a step CPS104 branches to other processes depending on the printing mode. In the case where the printing mode is the normal interval space mode and the data is $(00)_{16}$ or is the double interval space mode and the data is $(10)_{16}$, the process branches to a step CPS105 shown in FIG. 21B. The step CPS105 discriminates the address of the work to determine whether or not the beginning of the table is obtained. When the discrimination result in the step CPS105 is YES, a step CPS106 stores an increase mode $(01)_{16}$ in the control table, and a step CPS107 increments the address of the control table by one. A step CPS108 calculates a number $(s_1+s_4)$ of steps required to increase the speed from the stopped state to the speed $v_3$, and a step CPS109 stores the calculated number in the control table. Such a number of steps required to increase the speed will hereinafter be referred to as an increase step number. A step CPS110 increments the address of the control table by one, and a step CPS111 stores a constant speed (space) mode $(08)_{16}$ in the control table. A step CPS112 increments the address of the control table by one. A step CPS113 loads two bytes of data (number of space dots) from the work, and a step CPS114 increases the address of the work by two. Normally, in the case of the normal interval space mode, a step CPS115-1 sets the number of space dot rows as the space step number. On the other hand, in the case of the double interval space mode, a step CPS115-2 sets ½ the number of space dot rows as the space step number. A step CPS116 loads one byte of data from the work, and the process jumps to a step CPS122 when the printing mode is $(01)_{16}$ or $(02)_{16}$ in a step CPS117 shown in FIG. 21C. In the case where the printing mode is other than $(01)_{16}$ or $(02)_{16}$, that is, in the case where the printing mode is $(04)_{16}$, the discrimination result in the step CPS117 is NO and a step CPS118 increases the address of the work by three. A step CPS119 loads the data (printing mode) from the work, and a step CPS120 decreases the address of the work by three. A step CPS121 discriminates whether or not the printing mode is $(00)_{16}$ or $(10)_{16}$, that is, whether or not the printing mode is the space mode. When the discrimination result in the step CPS121 is YES, the process jumps to a step CPS133 shown in FIG. 22A. On the other hand, when the printing mode is a mode in which the printing is carried out with the speed $v_1$ and the discrimination result in the step CPS121 is NO, a step CPS122 calculates constant speed step number (space step number $-2s_4-s_2$). A step CPS 123 stores the calculated number in the control table, and a step CPS124 increases the address of the control table by two. A step CPS125 stores a decrease mode $(80)_{16}$ in the control table, and a step CPS126 increments the address of the control table by one. A step CPS127 stores the number $s_4$ of steps required to decrease the speed in the control table, and a step CPS128 increments the address of the control table by one. The number of steps required to decrease the speed will hereinafter by referred to as a decrease step number. A step CPS129 stores the constant speed (space) mode $(08)_{16}$ in the control table, and a step CPS130 increments the address of the control table by one. A step CPS131 stores the constant speed step number $s_2$ in the control table, and a step CPS132 increments the address of the control table by one. After the step CPS132, the process jumps to the step CPS101 shown in FIG. 21A.

The step CPS133 shown in FIG. 22A calculates the constant speed step number (space step number $-s_4-s_8-s_9$), and a step CPS134 stores the calculated number in the control table. A step CPS135 increases the address of the control table by two, and a step CPS136 stores the decrease mode $(80)_{16}$ in the control table. A step CPS137 increments the address of the control table by one, and a step CPS138 stores the decrease step number $s_8$ in the control table. A step CPS139 increments the address of the control table by one, and a step CPS140 stores the constant speed (space) mode $(08)_{16}$ in the control table. A step CPS141 increments the address of the control table by one, and a step CPS142 stores the constant speed step number $s_9$ in the control table. A step CPS143 increments the address of the control table by one, and the process jumps to the step CPS101 shown in FIG. 21A.

Figure 21B:
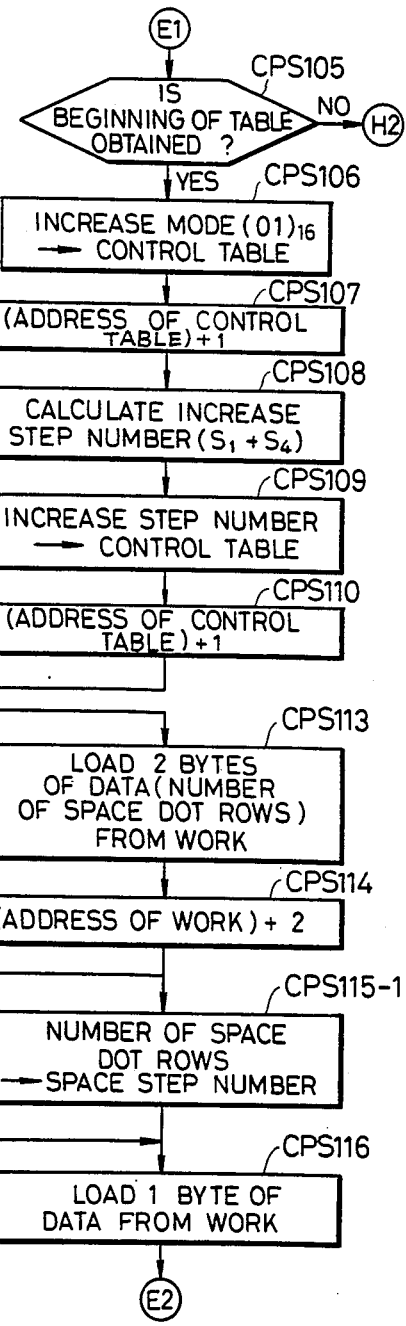

In the case where the discrimination result in the step CPS105 shown in FIG. 21B is NO, the process jumps to a step CPS144 shown in FIG. 22B. The step CPS144 stores the increase mode $(01)_{16}$ in the control table, and a step CPS145 increments the address of the control table by one. A step CPS146 discriminates whether or not the previous printing mode is $(04)_{16}$, that is, whether or not the previous printing mode is the high-speed printing mode. When the discrimination result in the step CPS146 is YES, the process jumps to a step CPS148. The step CPS148 stores the increase step number $s_8$ in the control table, and a step CPS149 increments the address of the control table by one. After the step CPS149, the process jumps to the step CPS111 shown in FIG. 21B. On the other hand, when the previous printing mode is not $(04)_{16}$ and the discrimination result in the step CPS146 is NO, that is, when the printing mode is a mode in which the printing is carried out with the speed $v_1$, a step CPS147 stores the decrease step number $s_4$ in the control table, and the process jumps to the step CPS149.

Figure 23:
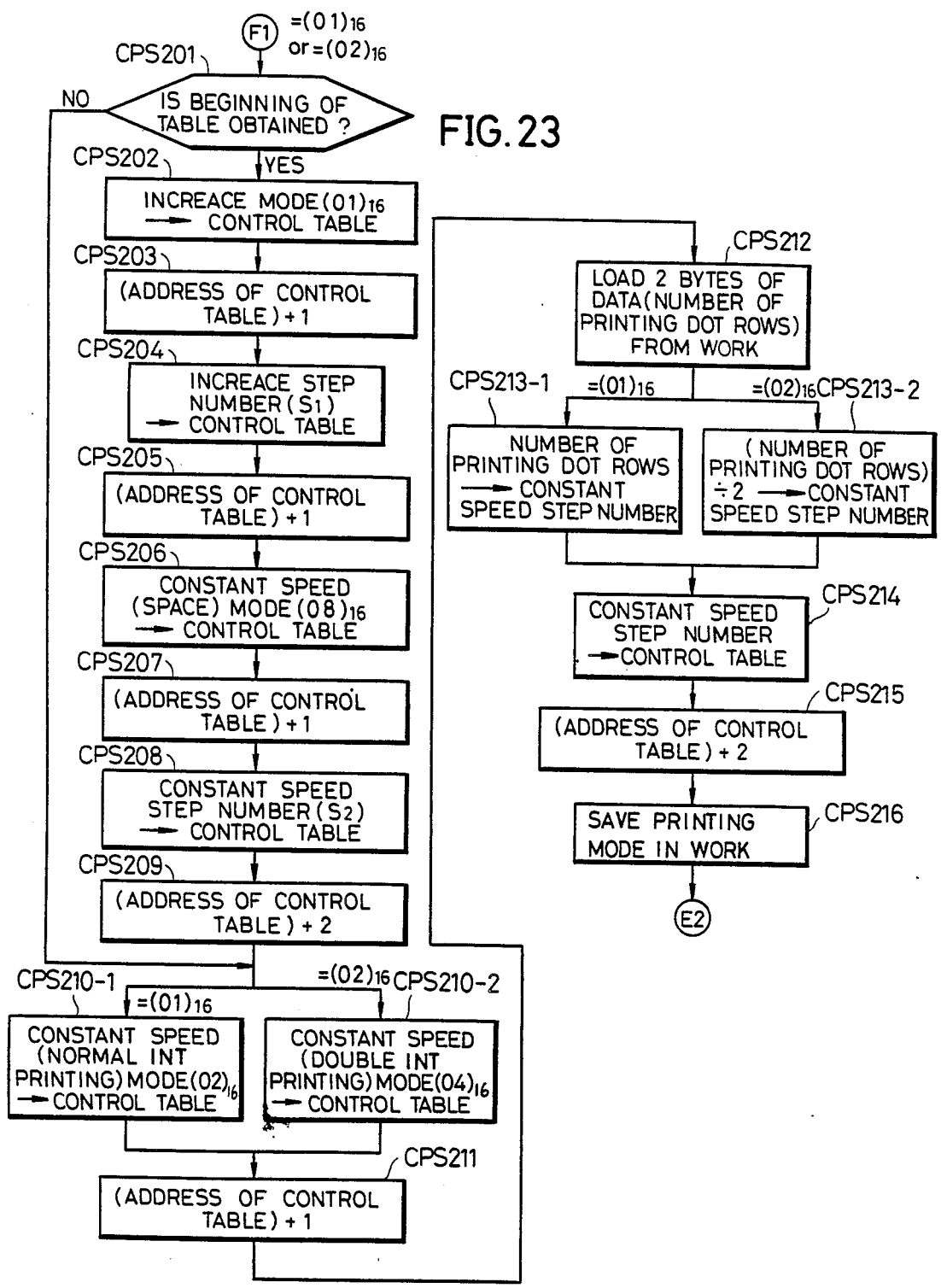

When the printing mode is $(01)_{16}$ or $(02)_{16}$ in the step CPS104 shown in FIG. 21A, that is, when the printing mode is a mode in which the printing is carried out with the speed $v_1$, the process branches to a step CPS201 shown in FIG. 23. The step CPS201 discriminates whether or not the beginning of the table is obtained. When the discrimination result in the step CPS201 is YES, a step CPS202 stores the increase mode $(01)_{16}$ in the control table, and a step CPS203 increments the address of the control table by one. A step CPS204 stores the increase step number $s_1$ in the control table, and a step CPS205 increments the address of the control table by one. A step CPS206 stores the constant speed (space) mode $(08)_{16}$ in the control table, and a step CPS207 increments the address of the control table by one. A step CPS208 stores the constant speed step number $s_2$ in the control table, and a step CPS209 increases the address of the control table by two. On the other hand, when the discrimination result in the step CPS201 is NO, the process jumps to a step CPS210-1 or CPS210-2. The step CPS210-1 stores the constant speed (normal interval printing) mode $(02)_{16}$ in the control table when the printing mode is $(01)_{16}$, and the step CPS210-2 stores the constant speed (double interval printing) mode $(04)_{16}$ in the control table when the printing mode is $(02)_{16}$. A step CPS211 increments the address of the control table by one, and a step CPS212 loads two bytes of data (number of rows of printing dots) from the work. In the case where the printing mode is $(01)_{16}$, a step CPS213-1 sets the number of printing dot rows as the constant speed step number, and a step CPS213-2 sets ½ the number of printing dot rows as the constant speed step number in the case where the printing mode is $(02)_{16}$. A step CPS214 stores the constant speed step number in the control table, and a step CPS215 increases the address of the control table by two. A step CPS216 saves the address of the control table, and the process jumps to the step CPS101 shown in FIG. 21A.

Figure 24:
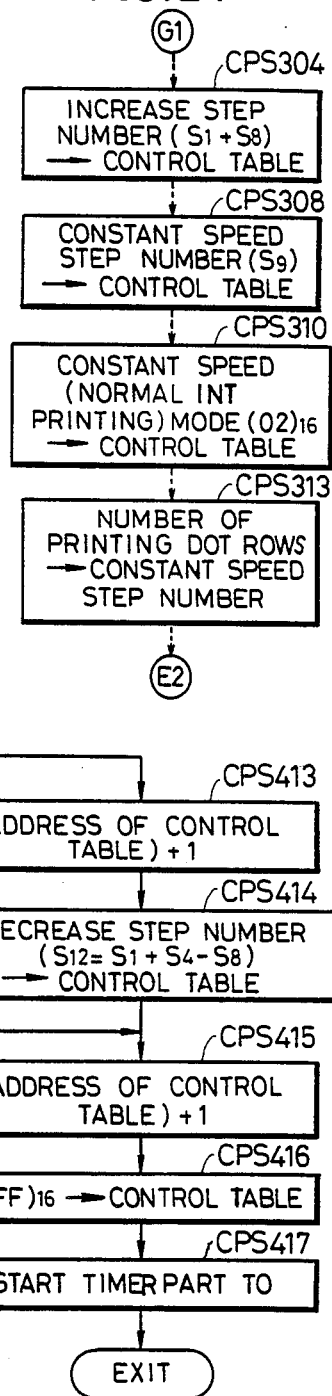

When the printing mode is $(04)_{16}$ in the step CPS104, that is, when the printing mode is a high-speed printing mode in which the printing is carried out with the speed $v_2$, the steps shown in FIG. 24 are performed. FIG. 24 only shows those steps which are different compared to the steps shown in FIG. 23. A step CPS304 which corresponds to the step CPS204 shown in FIG. 23 stores the increase step number $(s_1+s_8)$ in the control table. A step CPS308 which corresponds to the step CPS208 stores the constant speed step number $s_9$ in the control table. A step CPS310 which corresponds to the step CPS210 stores the constant speed (normal interval printing) mode $(02)_{16}$ in the control table. A step CPS313 which corresponds to the step CPS213 sets the number of printing dot rows as the constant speed step number.

In the case where the printing mode is $(FF)_{16}$ in the step CPS102 shown in FIG. 21A, the process jumps to a step CPS401 shown in FIG. 25. The step CPS401 stores the constant speed (space) mode $(08)_{16}$ in the control table, and a step CPS402 increments the address of the control table by one. A step CPS403 discriminates whether or not the previous printing mode is $(04)_{16}$. When the printing mode is a mode in which the printing is carried out with the speed is $v_1$ and the discrimination result in the step CPS403 is NO, a step CPS405 stores the constant speed step number $(s_2)$ in the control table, and a step CPS406 increases the address of the control table by two. A step CPS407 stores the decrease mode $(80)_{16}$ in the control table, and a step CPS408 increments the address of the control table by one. A step CPS409 stores the decrease step number $(s_1)$ in the control table, and the process jumps to a step CPS415. On the other hand, in the case where the previous printing mode is $(40)_{16}$ in which the printing is carried out with the speed $v_2$ and the discrimination result in the step CPS403 is YES, the process jumps to a step CPS410. The step CPS410 stores the constant speed step number $s_9$ in the control table, and a step CPS411 increases the address of the control table by two. A step CPS412 stores the decrease mode $(80)_{16}$ in the control table, and a step CPS413 increments the address of the control table by one. A step CPS414 stores the decrease step number $(s_{12}=s_1+s_4-s_8)$ in the control table, and a step CPS415 increments the address of the control table by one. A step CPS416 stores the termination mark $(FF)_{16}$ in the control table, and a step CPS417 sets a logic value "1" at the output terminal P0 of the output port 15 shown in FIG. 1 so as to start the channel of the timer part T0 of the programmable timer 16. Hence, the timing pulse signal 28 is generated from the programmable timer 16.

FIG. 26 shows the control table which is obtained from the table which stores the printing operation information and is shown in FIG. 17, based on the printing command shown in FIGS. 21A through 25. The control table shown in FIG. 26 comprises in the following sequence $(01)_{16}$, $s_1$, $(08)_{16}$, $s_2$, $(02)_{16}$, $s_3$, $(01)_{16}$, $s_4$, $(08)_{16}$, $s_5$, $(80)_{16}$, $s_4$, $(08)_{16}$, $s_2$, $(02)_{16}$, $s_6$, $(04)_{16}$, $s_7$, $(01)_{16}$, $s_4$, $(08)_{16}$, $s_{10}$, $(80)_{16}$, $s_8$, $(08)_{16}$, $s_9$, $(02)_{16}$, $s_{11}$, $(08)_{16}$, $s_9$, $(80)_{16}$, $s_{12}$, and $(FF)_{16}$. The values of $s_1$, $s_2$, $s_4$, $s_8$, $s_9$, and $s_{12}$ ($=s_1+s_4-s_8$) are peculiar to the printing apparatus of the present embodiment. The values of $s_3$, $s_5$, $s_6$, $s_7$, $s_{10}$, and $s_{11}$ are obtained by calculation from the constitution of the data received from the printer control apparatus. Hence, $s_3=P_1-1$, $s_5=N_1/2-2s_4-s_2$, $s_6=n_1{}^1 \cdot n_2{}^1-(P_1-1)-N_1$, $s_7=(P_2-1)/2$, $s_{10}=N_2/2-s_4-s_8-s_9$, and $s_{11}=n_1{}^3 \cdot n_2{}^3$. Further, $(01)_{16}$, $(02)_{16}$, $(04)_{16}$, $(08)_{16}$, and $(80)_{16}$ represent control modes. As defined in FIG. 19, $(01)_{16}$ represents the increase mode, $(02)_{16}$ represents the constant speed (normal interval printing) mode, $(04)_{16}$ represents the constant speed (double interval printing) mode, $(08)_{16}$ represents the constant speed (space) mode, and $(80)_{16}$ represents the decrease mode.

The iNT2 interrupt routine is generated when the timing clock pulse 28 is generated from the timer part T0 of the programmable timer 16, and the motor control routine 44 shown in FIGS. 27A through 31 is started. A step PMS1 shown in FIG. 27A performs the pre-interrupt process, and a step PMS2 loads the data (control mode) from the control table. A step PMS3 branches to other processes depending on the control mode. In the case where the control mode is the increase mode $(01)_{16}$, the process advances to a step PMS5 shown in FIG. 27B, and the step PMS5 loads the data. A step PMS6 supplies the data to the output port 15. A step PMS7 renews the data, and a step PMS8 saves the renewed data. A step PMS9 loads the data from a table (hereinafter referred to as a through table) which stores timer data (two bytes) for varying the pulse interval of the timing pulse signal 28, and step PMS10 sets the loaded data in a register of the programmable timer 16, which register is provided with respect to the timer part T0. A step PMS11 increases the address of the through table by two, and a step PMS12 increments the address of the control table by one. A step PMS13 loads the data (increase step number) from the control table, and a step PMS14 decrements the increase step number by one. A step PMS15 discriminates whether or not the result obtained by the decrementing in the step PMS14 is zero. When the discrimination result in the step PMS15 is NO, a step PMS16 returns the result obtained in the step PMS14 in the control table, and a step PMS17 decrements the address of the control table by one. After the step PMS17, the process jumps to a step PMS18. The step PMS18 increases the address of the control table by two, and the process jumps to a step PMS4 shown in FIG. 27C. It is assumed that the final set value with respect to the timer part T0 is $t_{PM}$.

The step PMS4 performs an after-interrupt process, and a step PMS19 allows the interrupt and returns the process. When the control mode is in the constant speed (space) mode $(08)_{16}$ in the step PMS2 shown in FIG. 27A, the process branches to a step PMS101 shown in FIG. 28. The step PMS101 loads the data, and a step PMS102 supplies the data. A step PMS103 renews the data, and a step PMS104 saves the data. A step PMS105 increments the address of the control table by one, and a step PMS106 loads the data (constant speed step number) from the control table. A step PMS107 decrements the constant speed step number by one, and a step PMS108 discriminates whether or not the result of the decrementing in the step PMS107 is zero. When the discrimination result in the step PMS108 is NO, a step PMS109 returns the result in the control table. A step PMS110 decrements the address of the control table by one, and the process jumps to the step PMS4 shown in FIG. 27C. On the other hand, when the discrimination result in the step PMS108 is YES, the process jumps to a step PMS111. The step PMS111 increases the address of the control table by three, and a step PMS112 loads the control mode. A step PMS113 discriminates whether or not the control mode is $(02)_{16}$. When the discrimination result in the step PMS113 is YES, a step PMS114 sets the pulse interval $t_{PM}$ of the timing pulse signal 28 in the timer part T1 of the programmable timer 16, and the process jumps to a step PMS117. When the discrimination result in the step PMS113 is NO, the process jumps to a step PMS115. The step PMS115 discriminates whether or not the control mode is $(04)_{16}$, that is, whether or not the control mode is the constant speed (double interval printing) mode. When the discrimination result in the step PMS115 is YES, a step PMS116 sets $t_{PM}/2$ in the timer part T1. The step PMS117 sets a logic value "1" at the terminal P1 of the output port 15 so as to start the timer part T1. A step PMS118 loads the print starting address from the table shown in FIG. 20 which stores the print starting address, and a step PMS119 transfers the print starting address to the work so as to provide the address information of the line buffer supplied to the dot control routine. A step PMS120 renews the address of the table which stores the print starting address. The table shown in FIG. 20 which stores the print starting address, is made in advance by use of the printing operation information shown in FIG. 17. Description on the making of this table shown in FIG. 20 will be omitted in the present specification since it is relatively easy for those skilled in the art to make this table. Due to the execution of the step PMS117, the timing pulse signal 29 is generated from the timer part T1 of the programmable timer 16 shown in FIG. 1 and the signal 23 is generated from the terminal T2, and the printing elements of the printing head are driven.

In the case where the control mode is the constant speed (normal interval printing) mode $(02)_{16}$ or the constant speed (double interval printing) mode $(04)_{16}$ in the step PMS3 shown in FIG. 27A, the process branches to a step PMS201 shown in FIG. 29. The steps PMS201 through PMS212 shown in FIG. 29 are similar to the steps PMS101 through PMS112 shown in FIG. 28, and a step PMS213 discriminates whether or not the control mode is $(02)_{16}$. A step PMS214 sets $t_{PM}$ in the timer part T1 when the discrimination result in the step PMS213 is YES, and the process jumps to a step PMS217. On the other hand, when the discrimination result in the step PMS213 is NO, the process jumps to a step PMS215. The step PMS215 discriminates whether or not the control mode is $(04)_{16}$, and a step PMS216 sets $t_{PM}/2$ in the timer part T1 when the discrimination result in the step PMS215 is YES. The step PMS217 loads the print starting address from the table shown in FIG. 20, and a step PMS218 transfers the print starting address to the work. A step PMS219 renews the address of the table which stores the print starting address, and the process jumps to the step PMS4 shown in FIG. 27C. In the case where the discrimination result in the step PMS215 is NO, the process jumps to a step PMS220. The step PMS220 sets a logic value "0" at the terminal P1 of the output port 15 so as to stop the generation of the timing pulse signal 29 and the signal 23.

In the case where the control mode is the decrease mode $(80)_{16}$ in the step PMS3 shown in FIG. 27A, the process branches to a step PMS301 shown in FIG. 30. The steps PMS301 through PMS306 are similar to the steps PMS5 through PMS10 shown in FIG. 27B, and a step PMS307 decreases the address of the through table by two. A step PMS308 increments the address of the control table by one, and a step PMS309 loads the data (decrease step number) from the control table. A step PMS310 decrements the decrease step number by one, and a step PMS311 discriminates whether or not the result obtained in the step PMS310 is zero. When the discrimination result in the step PMS311 is NO, a step PMS312 returns the result in the control table. A step PMS313 decrements the address of the control table by one, and the process jumps to the step PMS4 shown in FIG. 27C.

Figure 31:
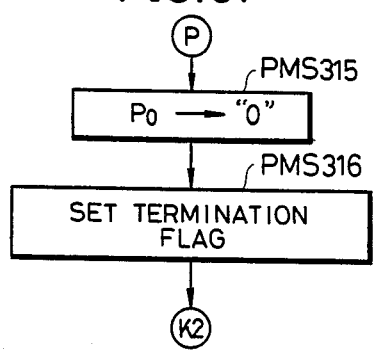

When the control mode in the step PMS3 shown in FIG. 27A is $(FF)_{16}$, the process branches to a step PMS315 shown in FIG. 31. The step PMS315 sets a logic value "0" at the terminal P0 so as to stop the generation of the timing pulse signal 28. A step PMS 316 sets a termination flag, and the process jumps to the step PMS4 shown in FIG. 27C.

Figure 32:
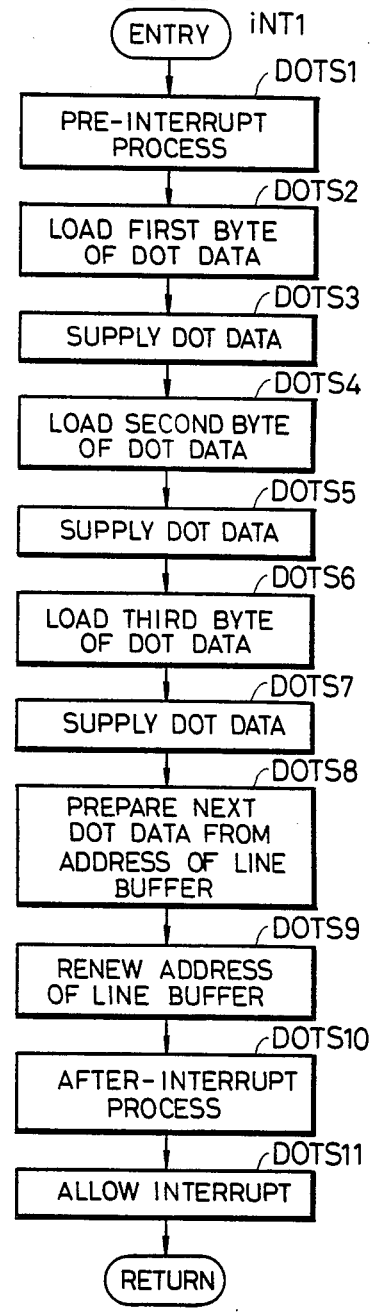
FIG. 32 is a flow chart showing a dot control program.

Due to the execution of the step PMS117, the timing pulse signal 29 and the signal 23 are generated, the iNT1 interrupt routine is generated responsive to the rising edge of the signal 23, and the dot control routine 43 shown in FIG. 32 is started. In FIG. 32, a step DOTS1 performs a pre-interrupt process. A step DOTS2 loads the first byte of the dot data, and a step DOTS3 sets the loaded first byte of the dot data at a first port of the output port 14. A step DOTS4 loads the second byte of the dot data, and a step DOTS5 sets the loaded second byte of the dot data at a second port of the output port 14. A step DOTS6 loads the third byte of the dot data, and a step DOTS7 sets the loaded third byte of dot data at a third port of the output port 14. A step DOTS8 prepares the next dot data from the address of the line buffer, and a step DOTS9 renews the address of the line buffer. A step DOTS10 performs an after-interrupt process, and a step DOTS11 allows the interrupt and returns the process.

By the processes and controls described heretofore, control timing charts corresponding to $A_1$ and $A_2$ shown in FIG. 15 become as shown in FIGS. 33(A) through 33(E). FIGS. 33(A) through 33(E) show timings of the timing pulse signal 28, the data, the timing pulse signal 29, the signal 23, and the dot data, respectively. The printed result becomes as shown in FIG. 8 and the normal printing is carried out.

Figure 35:
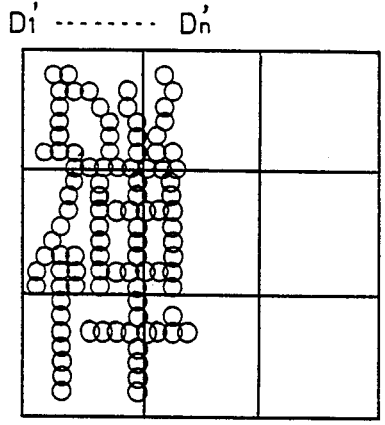
FIG. 35 shows a result obtained by the ½-width scaled down character printing.
Figure 36:
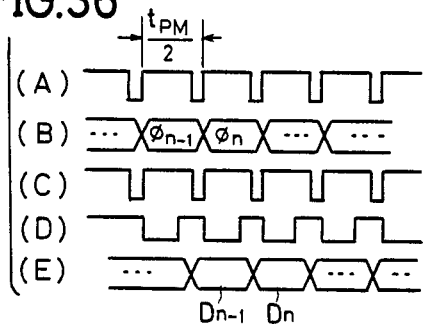
FIG. 36 shows control time charts for a high-speed character printing.

On the other hand, control timing charts corresponding to B' shown in FIG. 15 become as shown in FIGS. 34(A) through 34(E). As in the case of FIGS. 33(A) through 33(E), FIGS. 34(A) through 34(E) show the timings of the timing pulse signal 28, the data, the timing pulse signal 29, the signal 23, and the dot data, respectively. In this case, the printed result becomes as shown in FIG. 35, and the ½-width printing is carried out.

Control timing charts corresponding to C' shown in FIG. 15 become as shown in FIGS. 35(A) through 35(E). As in the case of FIGS. 33(A) through 33(E), FIGS. 35(A) through 35(E) show the timings of the timing pulse signal 28, the data, the timing pulse signal 29, the signal 23, and the dot data, respectively. In this case, the printed result becomes as shown in FIG. 10, and the printing is carried out by extracting dots with a predetermined interval from successive dots.

Figure 33:
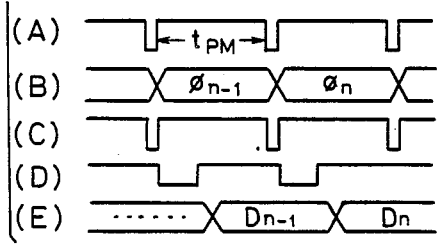
FIG. 33 and FIG. 34 are control time charts for a normal character printing and a ½-width scaled down character printing, respectively.
Figure 34:
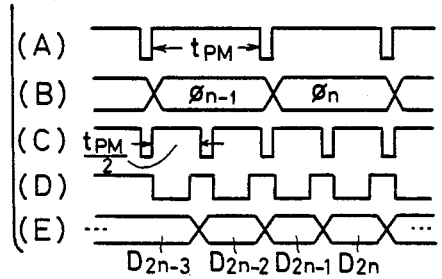

In FIG. 33, the pulse interval of the timing pulse signal 28 is $t_{PM}$ and is identical to that of the timing pulse signal 29. However, in FIG. 34, the pulse interval of the timing pulse signal 29 is $t_{PM}/2$ and is ½ that of the timing pulse signal 28. Accordingly, in FIG. 34, the dot data of two dot rows are generated for one renewal of the date (advancement of one step). Further, in FIG. 35, the pulse intervals of the timing pulse signals 28 and 29 are both $t_{PM}/2$.

In the embodiment described heretofore, description is given for the case where the reduction factor n/m is equal to ½, where n represents the width of the printed character and m represents the width of the original character. However, the present invention is not limited to the case where the reduction factor n/m is equal to ½. The reduction factor may be freely selected depending on the arrangement between the printer control apparatus and the printer apparatus, and the commands may be defined for each selected reduction factor.

In actual practice, the application of the present invention is probably most frequent in cases where the reduction factor n/m is between ½ and one. Although the reduction factor can be selected arbitrarily, it becomes impossible to commonly use a program for different reduction factors when there exists a process or control peculiar for a certain reduction factor, and in this case, it becomes necessary to add a number of programs corresponding to the number of different reduction factors. However, there is a problem in that the processing efficiency becomes poor when a program must be added for each of the different reduction factors. Hence, as a measure of avoiding such a problem, the reduction factors may be described by a parameter, and the program can be used in common for different reduction factors by substituting the value peculiar to each reduction factor into the parameter. The step CPS115-2 shown in FIG. 21B and the step CPS213-2 shown in FIG. 23 and the step PMS116 shown in FIG. 28 and the step PMS216 shown in FIG. 29 are examples of a part of the program which is affected by the different reduction factors. In these examples, the part "÷2" of the process can be generally described by a parameter n/m.

In the case where the reduction factor n/m is ½ the timing pulse signals 28 and 29 do not need to be generated by use of two timer parts as shown in FIG. 1, and it is possible to use the output of the AND gate 37 shown in FIG. 2 to obtain the timing pulse signal 29. However, in this case, the process shown in FIG. 29 must be slightly modified when the printing is carried out with the reduction factor n/m of ½ (that is, ½-width printing). In other words, in the part of the process shown in FIG. 29 where the data is renewed, the data must be renewed only once for two generations of the iNT2 interrupt routine, and the previous data must be supplied once as it is.

Next, description will be given with respect to the arrangement of the printing elements of the printing head, and the relationship between the processes or controls.

The description of the invention given heretofore may be applied to a printer in which the printing elements of the printing head are arranged in one row. However, most conventional printers for printing chinese characters comprise two rows of printing elements arranged in a quincunx (or checkered) pattern, and a problem will occur when the description given heretofore is simply applied to such printers. In the conventional printer comprising two rows of printing elements arranged in the quincunx pattern, the step DOTS8 shown in FIG. 32 performs a predetermined data editing operation with respect to the leading and trailing rows of printing elements so that the data are appropriately printed by the two rows of printing elements, and this predetermined data editing operation can be employed in the embodiment of the present invention. In addition, in the printing operation shown in FIG. 15, there will be no coordination in the case where the printing data is continuous because the dot interval differs before and after the boundary between $A_2$ and B', and the printing of $A_2$ and B' cannot be carried out successively. In order to avoid this inconvenience, a predetermined quantity (a×m/n or 2a in the example shown in FIG. 15 when the dot interval between the leading and trailing rows of printing elements is represented by (a) of space dots are inserted in the boundary part. The dot interval is 1/180 inches and a=8 dots, for example, and the size of the above space is an extremely small space which is 1/180 ×25.4×8×2=2.26 mm. Hence, it is sufficient to provide a space of one character for the above space. In order to eliminate the need to insert the above space, it is necessary to provide two timers so that the leading and trailing rows of printing elements can be driven with completely independent timings. Further, the output ports must be divided into two and the interrupt routines must also be divided into two so as to carry out a simple control. However, study needs to be done with respect to the details. In other words, when driving the leading and trailing rows of printing elements with independent timings, the hardware becomes complicated, and a general method of avoiding such complexity is to carry out the printing in two stages before and after the boundary between $A_2$ and B' (between the normal printing and ½-width printing). In the first stage, the part $A_2$ is printed and the printing head is once stopped, and the printing head is returned and thereafter fed again to carry out the printing of the part B' in the second stage.

Next, in the case where the interval between the leading and lagging rows of printing elements is not an integral multiple of the dot interval, the timings with which the two rows of printing elements are driven differ. In this case, the timing with which one row of printing elements is driven is taken as a reference and the timing with which the other row of printing elements is driven is delayed by a predetermined time with respect to the reference timing. Moreover, the construction of the output port 14 (that is, the latching of the dot data) must be changed from that shown in FIG. 1. However, these measures are conventionally taken, and description thereof will therefore be omitted.

In the embodiment, the printing operation is only described with respect to one direction. However, the same concept can be used to carry out the printing operation in two directions by making slight modifications.

When the high-speed printing is successively carried out as indicated by C' in FIG. 15, there is a problem in that the processing capability is low although the printing speed is high. This problem occurs because the majority of the processes are dependent on the dot control routine and the motor control routine and the data entering capability during the printing is greatly deteriorated. In order to overcome this problem, the capability of the high-speed printing process shown in FIGS. 9A and 9B is improved under the condition that the dot data generating capability during the high-speed printing does not exceed the data entering capability. In other words, the processing capability of the high-speed printing can be improved by adding another data reception routine in which the steps CS200, CS201, CS220 through CS225, and CS228 are deleted from the process shown in FIGS. 9A and 9B.

In the present embodiment, the printing is carried out by changing the reduction factor with respect to the width (horizontal) direction of the character. However, the present invention is not limited to the reduction with respect to the width direction of the character, and it is possible to also arbitrarily change the interval with respect to the height (vertical) direction of the character. For example, in a word processing system for Chinese characters or the like, the characters can be printed horizontally and vertically since Japanese, for example, is written from left to right and also up and down. In such a word processing system, the processing in accordance with the present invention is performed with respect to the data related to the characters which are to be printed vertically, so as to arbitrarily change the interval also with respect to the vertical direction. The present embodiment is described in conjunction with the serial printer, however, it is evident that the present invention is also applicable to a display apparatus or the like.

In the case of a cathode ray tube (CRT) apparatus, the dot density in the horizontal and vertical directions may be increased, and the display interval between the dots may be arbitrarily changed with respect to the horizontal and vertical directions. By taking such measures, it is possible to display a character which is enlarged two-dimensionally by combining various reduction factors in both the horizontal and vertical directions.

Figure 37:
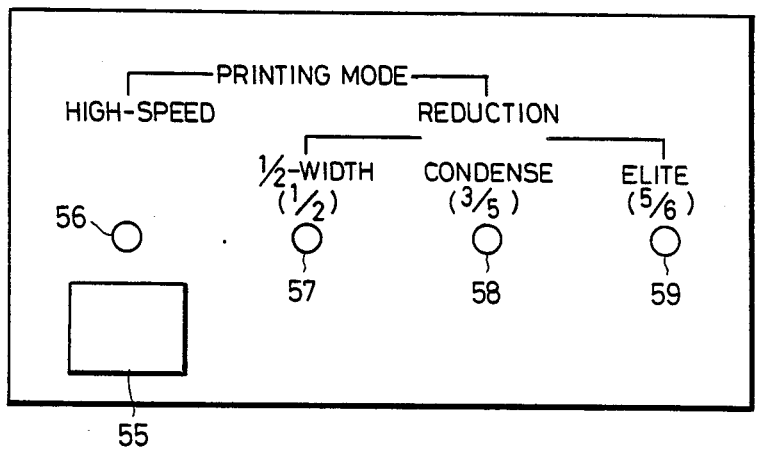
FIG. 37 shows an operation panel of a printing apparatus.

In the description give heretofore, there is described the example wherein the method of generating the dot pattern is designated by the ESC sequence command which is transmitted from the printer control apparatus with respect to the printing apparatus. In this example, the printer control apparatus must support the function of the ESC sequence command. Regardless of the printing control apparatus, the following method is effective when changing the method of generating the dot pattern. FIG. 37 shows an operation panel of the printing apparatus. The operation panel comprises a mode setting switch 55, a light emitting diode (LED) display 56 corresponding to the high-speed printing, an LED display 57 corresponding to the ½-width printing mode (n/m=½), an LED display 58 corresponding to a condensed printing mode (n/m=3/5), and an LED display 59 corresponding to an elite mode (n/m=5/6). The internal mode of the printing apparatus is successively changed when an operator pushes the mode setting switch 55, and the LED display corresponding to the selected mode is turned ON and the dot pattern is generated in correspondence with the selected mode.

Figure 38:
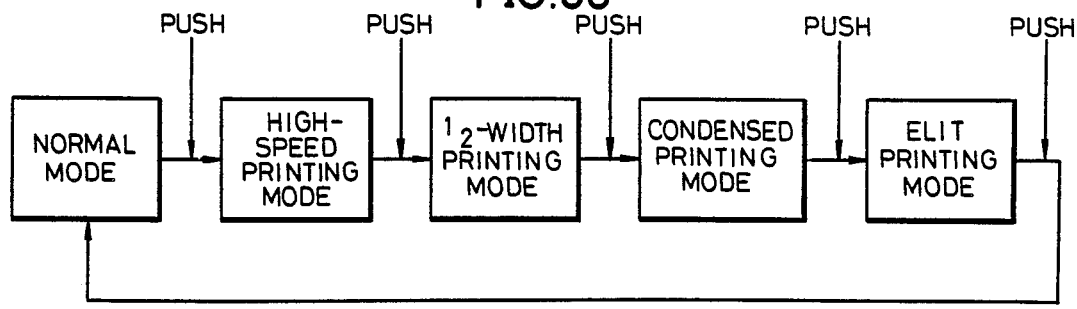
FIG. 38 shows changes in internal mode by the pushing of mode setting switches.

FIG. 38 shows an example of a method of changing the internal mode of the printing apparatus responsive to the pushing of the mode setting switch 55. In an initial state, the internal mode is set to the normal mode (n/m=1 and no extraction of predetermined dots), and the mode changes to the high-speed printing mode and the LED display 56 is turned ON responsive to the pushing of the mode setting switch 55. When the mode setting switch 55 is pushed the next time, the mode changes to the ½-width printing mode and the LED display 57 is turned ON. When the mode setting switch 55 is pushed the next time, the mode changes to the condensed printing mode and the LED display 58 is turned ON. Further, when the mode setting switch 55 is pushed the next time, the mode changes to the elite mode and the LED display 59 is turned ON. The mode changes back to the normal mode responsive to the next pushing of the mode setting switch 55, and none of the LED displays 56 through 59 is turned ON. By adding these functions to the printing apparatus, it is possible to provide a convenient printing apparatus which can arbitrarily select the method of generating the dot pattern regardless of the printer control apparatus.

According to the present invention, the printing can be carried out with a speed higher than that of the normal printing with a printing interval which is changed arbitrarily between ½ and one, for example, without making a considerable modification to the conventional hardware construction and connections. In addition, it is possible to successively and efficiently carry out the printing even in the case where characters of different intervals coexist in the same printing line.

Further, the present invention is not limited to these embodiments, but various variations and modifications may be made without departing from the scope of the present invention.

What is claimed is:
1. A dot pattern generating system comprising:
a movable printing head carrying a plurality of dot generating elements which are selectively energized to generate a dot pattern;
timing signal generating means for generating a first timing signal for controlling the movement of the movable printing head as a function of the spacing between adjacent dots to be generated by the movable head and for generating a second timing signal for controlling the activation of the individual dot generating elements, the generation of the first and second timing signals being independent of each other;

means for moving the printing head in response to the first timing signal to displace the printing head a distance which is a function of the first timing signal;

means for providing a dot pattern with a predetermined number of dots;

means, coupled to the means for storing and the means for providing, for extracting a predetermined number of dots from the dot pattern with a predetermined number of dots to produce a resultant dot pattern and storing the resultant dot pattern;

means responsive to the second timing signal for controlling the activation of the plurality of dot generating elements in accordance with the stored resultant dot pattern.

2. A dot pattern generating system in accordance with claim 1 wherein the means for extracting executes an algorithm for producing the resultant dot pattern equal to the logic operation $(\overline{D_{n-1}} \cdot D_n)$ wherein $\overline{D_{n-1}}$ represents inverted data obtained by extraction from the dot immediately preceding the dot being processed and $D_n$ represents the data of the dot being processed.

3. A dot pattern generating system in accordance with claim 1 wherein the duration of the first timing signal is equal the duration of the second timing signal with the cycles of the first and second timing signals being time coincident.

4. A dot pattern generating system in accordance with claim 1 wherein the duration of the first timing signal is twice that of the second timing signal with the beginning of every other second timing signal occurring with the beginning of the first timing signal.

5. A dot pattern generating in accordance with claim 1 wherein the relative intervals of the first and second timing signals are selectable to produce a reduced width pattern with the second time interval being selected as less than the first time interval.

6. A dot pattern generating system in accordance with claim 1 wherein the means for moving the printing head is a stepping motor.

7. A dot pattern generating system in accordance with claim 1 wherein the printing head is an impact printer.

* * * * *